United States Patent [19]

Angell, Jr.

[11] Patent Number: 4,692,291

[45] Date of Patent: Sep. 8, 1987

[54] MOLDING METHOD USING FAST CURING FIBER REINFORCED, LOW VISCOSITY THERMOSETTING RESIN

[75] Inventor: Richard G. Angell, Jr., Bridgewater, N.J.

[73] Assignee: Union Carbide Corporation, Danbury, Conn.

[21] Appl. No.: 607,733

[22] Filed: May 9, 1984

Related U.S. Application Data

[63] Continuation of Ser. No. 135,906, Apr. 14, 1980, which is Continuation-in-part of Ser. No. 35,011, May 1, 1979, abandoned.

[51] Int. Cl.$^4$ .................. B29C 43/20; B29C 45/16
[52] U.S. Cl. ............................ 264/109; 264/102; 264/120; 264/255; 264/257; 264/259; 264/328.14; 264/328.2; 264/328.6
[58] Field of Search ............ 425/557, 547, 543; 264/257, 328.14, 328.6, 318.2, 102, 257, 109, 255, 259, 120

[56] References Cited

U.S. PATENT DOCUMENTS

| | | | |
|---|---|---|---|
| 3,137,750 | 6/1964 | Gringras | 264/257 |
| 3,192,297 | 6/1965 | Gringras | 264/257 |
| 3,222,421 | 12/1965 | Lundberg | 525/39 |
| 3,442,998 | 5/1969 | Wiltshire | 264/128 |
| 3,608,150 | 9/1971 | Laufer et al. | 425/543 |
| 3,748,075 | 7/1973 | Taylor | 425/543 |
| 3,819,312 | 6/1974 | Arpajian | 425/543 |
| 3,899,277 | 8/1975 | Winter | 425/126 R |
| 3,903,343 | 9/1975 | Pfaff | 264/255 |
| 3,975,479 | 8/1976 | McClean | 264/257 |
| 4,011,651 | 3/1977 | Bradbury et al. | 264/128 |
| 4,051,290 | 9/1977 | Jutte et al. | 264/255 |
| 4,076,788 | 2/1978 | Ditto | 264/255 |
| 4,081,578 | 3/1978 | Van Essen et al. | 264/255 |
| 4,085,810 | 4/1978 | Stoffey | 264/128 |
| 4,091,061 | 5/1978 | Turbier et al. | 264/328.7 |
| 4,104,353 | 8/1978 | Monnet | 264/255 |
| 4,121,646 | 10/1978 | Rikker | 425/145 |
| 4,123,493 | 10/1978 | Schicke et al. | 264/328.7 |
| 4,149,838 | 4/1979 | Sutch | 425/126 R |
| 4,153,490 | 5/1979 | Werz et al. | 264/257 |
| 4,199,388 | 4/1980 | Tracy et al. | 264/137 |
| 4,205,031 | 5/1980 | Almqvist et al. | 264/255 |
| 4,207,282 | 6/1980 | Grisch | 264/257 |
| 4,219,598 | 8/1980 | Noma et al. | 428/286 |
| 4,234,633 | 11/1980 | Gowetski et al. | 264/257 |
| 4,235,833 | 11/1980 | Arnason et al. | 264/255 |
| 4,238,437 | 2/1980 | Rolston | 264/102 |
| 4,245,006 | 1/1981 | Shanoski | 264/255 |

FOREIGN PATENT DOCUMENTS

| | | |
|---|---|---|
| 1404387 | 11/1968 | Fed. Rep. of Germany . |
| 2121209 | 11/1971 | Fed. Rep. of Germany . |
| 2135181 | 5/1975 | Fed. Rep. of Germany . |
| 2529214 | 1/1976 | Fed. Rep. of Germany . |
| 2548751 | 5/1977 | Fed. Rep. of Germany . |
| 2015915 | 9/1979 | United Kingdom . |

OTHER PUBLICATIONS

Glasstone, Textbook of Physical Chem., Van Nostrand, N.Y. (1962), pp. 1086–1088.

Hawley, Condensed Chemical Dictionary, Van Nostrand, N.Y. (1977), p. 444.

Whittington, "Whittingtons Dictionary of Plastics," Technomic, Stamford, (1968), pp. 115, 117.

Schmidt et al., Principles of High Polymer Theory . . . , McGraw-Hill (1948), pp. 323, 324, 335, and 335.

Primary Examiner—Willard E. Hoag
Attorney, Agent, or Firm—M. N. Reinisch

[57] ABSTRACT

A method of making a resin-impregnated molded fiber reinforced article including use of a thermosetting resin having a specified low viscosity and fast curing time with a specified fiber content for producing an article with improved strength.

29 Claims, 21 Drawing Figures

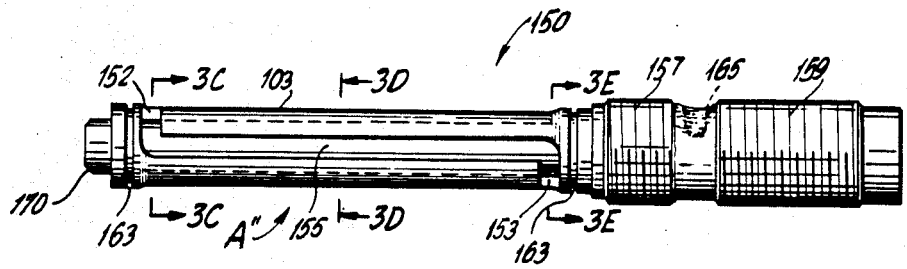
FIG.3A
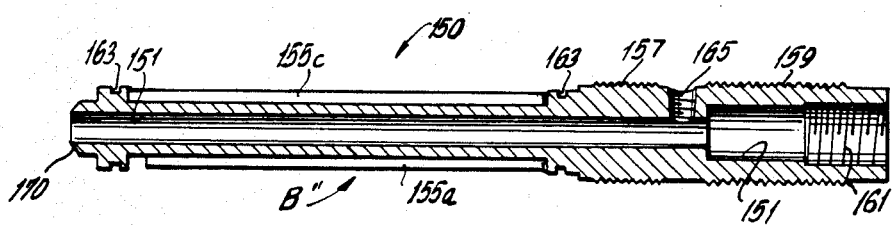
FIG.3B
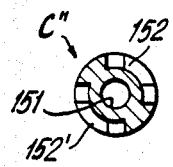 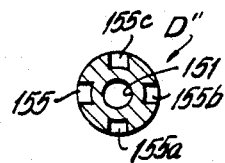 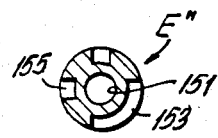
FIG.3C   FIG.3D   FIG.3E
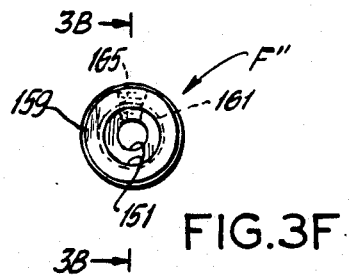
FIG.3F

MOLDING METHOD USING FAST CURING FIBER REINFORCED, LOW VISCOSITY THERMOSETTING RESIN

This application is a continuation of application Ser. No. 135,906 filed 4/14/80, which is a continuation-in-part of application Ser. No. 035,011 filed 5/1/79; both now abandoned.

This invention relates to a process for the rapid fabrication of a fiber reinforced thermoset resin article suitable for uses for which the usual fiber reinforced thermoset resin articles are employed or because of their unique properties and recurrent uniformity, for untypical uses. In particular, this invention relates to producing a relatively uniform fiber reinforced thermoset resin article in which the fiber reinforcement comprises one or more fibers with a melting point and a glass transition temperature above about 130° C. The process of this invention provides a unique rapid system of injecting a thermosettable liquid organic material into a mold containing an interlocked mass of fibers made of one or more fibers with a melting point or a glass transition temperature above about 130° C. The present process greatly reduces the time in which fiber reinforced thermosettable resin articles can be produced, and simplifies the overall process for their production. The fiber reinforced thermosettable resin articles are particularly desirable for their high strength. A prime use for them is in the making of automotive parts. Of particular importance, this invention allows the essentially exact and rapid replication of thermoset fiber reinforced molded parts wherein the uniformity in a repetitive molding operation is superior to that obtainable by any other rapid process for producing high strength composites.

FRP, i.e., fiber reinforced plastic and resin articles are widely used by the automotive and other industries in products which meet aesthetic requirements and/or can withstand severe property and useage requirements. This invention is concerned with such types of articles.

Fiberglass has been widely used as a reinforcement in the manufacture of thermoset molded articles. These types of articles have been termed "Glass Reinforced Plastics" (GRP) and "Glass Fiber Reinforced Plastics" (GFRP). The fiberglass content in these thermoset molded articles ranges from about 15 to about 80 weight percent. The resin component in these glass reinforced thermoset articles are primarily polyesters. These polyesters are derived from unsaturated polyester resins. The unsaturation is typically provided by maleate and fumarate unsaturation within the backbone of the polyester, prior to cross-linking. These polyesters are formed by reacting maleic acid or anhydride with a dihydric alcohol or a combination of a dihydric alcohol and a dicarboxylic acid or anhydride, such as phthalic acid or anhydride, isophthalic acid, terephthalic acid, or a saturated aliphatic dicarboxylic acid, such as adipic acid. The dihydric alcohols which are typically used to make these polyesters include ethylene glycol usually employed in combination with other glycols, i.e., 1,2-propylene glycol, dipropylene glycol, diethylene glycol, and the like or 1,2-propylene glycol alone or in combination with other polyols. Some unsaturated polyester resins are made by the reaction of carbic acid, which is the Diels-Alders reaction product of maleic anhydride and cyclopentadiene or dicylopentadiene with a polyol and additional maleic anhydride. The cyclopentadiene and dicyclopentadiene can also be reacted with a preformed maleic derived unsaturated polyester resin to form either a cyclopentadiene adduct with the terminal hydroxyl or carboxyl or internal Diels-Alders reaction products. These reins have high viscosities which are substantially reduced when they are combined with styrene.

The aforedescribed polyester resins have been employed in the manufacture of a variety of glass reinforced products by different types of processes. The processes of forming glass reinforced products are generally of two categories, i.e., wet lay up and thickened processes. Wet lay up processes include the following: pre-impregnation of a fibrous mass with resin followed by compression molding; preforming, in which cut fiber and resin are sprayed onto a mold form itself; mat molding, in which liquid resin is poured onto a mat while the mat is disposed in a compression mold; bulk molding, in which a non-thickened mixture of short cut staple fibers and polyester resin are poured into a mold.

In thickened processes, polyester resins react through their available carboxylic acid groups with alkaline earth metal oxides or hydroxides, such as magnesium oxide and calcium hydroxide (the "thickening agents") to increase the viscosity of the fiber containing resin so that it has a non-liquid and paste-like quality. The resin can then be more conveniently handled and deposited within the framework of a mold. Sheet molding compounds (SMC) are formed by depositing resins across a layer of cut fiberglass fibers already randomly deposited upon a moving continuous sheet of polyethylene film. The polyethylene film is sandwiched by another layer of moving polyethylene film and the combination is fed through nip rollers which blend the polyester resin within the fibrous layer to form a sheet. The sheet is allowed to stand so that reaction occurs between the limited number of carboxylic groups of the polyester resin and the alkaline earth metal oxide or hydroxide thickening agent. The resin increases in viscosity and it can then be easily handled by hand for use in the molding procedure.

Though SMC processes have gained substantial favor in commercial FRP applications, they are not without substantial problems. A sheet molding compound must go through an extended maturation period, ranging from about 1 day to about a week, to achieve the level of thickening desired. Thickening serves to assure glass fiber flow with the resin. If the viscosity of the resin is not high enough to carry the glass fiber, the resultant molded part can have non-uniform glass fiber distribution. This leads to non uniform parts. The physical property uniformity across a molded part made from sheet molding compounds may vary significantly, caused by fiber orientation and resin distribtuion. The uniformity from one part to another, in molding with SMC., can vary about 10% or more on a weight basis.

Another problem associated with SMC is the handling problem. Though SMC can be easily placed in a compression mold, hand labor is generally needed. Thus, SMC as employed today is difficult to automate. Though SMC can be die cut to the shape of the mold, such is difficult to do when the dies are male and female. As a result, pieces of the SMC are placed in the mold and the viscosity of the fiber reinforced compound during compression is depended on to spread the fibers throughout the mold. This leads to uneven spreading of resin and/or fiber in the mold, as well as undesirable fiber orientation. Fiber orientation causes large discrepancies in the physcial properties of the article.

SMC molding is a time consuming operation since the mold cycle depends on hand layups of SMC in the mold and a time consuming compression molding cycle. SMC are employed in making parts relatively low in fiber content, usually below 40 weight percent fiber.

Alkaline earth metal oxide or hydroxide filler thickening agents are added to the bulk molding composition in an amount sufficient to cause thickening of the resin composition to a desired viscosity so that it can be readily handled. The thickened bulk molding compounds are typically employed in transfer moldings, but some use in injection molding has been considered.

Thickened bulk molding compounds have not been widely used in injection molding because their viscosities are normally higher than is desirable for effective molding, and the equipment required to mold such high viscosity thickened bulk molding compound is extremely expensive, large, and cumbersome to operate. A further disadvantage in using thickened bulk molding compounds in an injection molding process is that the fibers must be of very short length in order to effectively distribute the fiber throughout the mold. The short lengths of the fibers minimizes the reinforcement, so that the resulting molded article does not have optimum performance characteristics, particularly strength properties.

However, polyester resin systems have been developed which provide good surface properties to the molded product. These polyester resin systems are used in the manufacture of "Class A" molded products employed in the automotive industry. These products have extremely low profile surfaces which are free of warpage, undulations, and fiber protrusions. This low profile results from adding a low profile additive to the BMC or SMC formulation. A low profile additive is a thermoplastic compound which contains a sufficient number of carboxylic acid groups allowing it to become intricately bound into the resin system containing the thickening agent so that it is not exuded therefrom. Low profile additives can also be utilized in wet-lay up processes to form glass reinforced products. Non-carboxylic containing thermoplastics are very effective low profile additives for resin systems used in the wet-lay up process, although carboxylic containing thermoplastics presently available for the same purpose can be so utilized.

The glass fiber reinforced polyester resin systems which are used to form "Class A" products typically contain from about 15 to 40 weight percent of glass fiber. These fiber reinforced polyester resin systems are used to mold products where surface appearance is very important, but strength properties are not necessarily as important. However, structural articles are expected to have high strength properties. For example, "Class A" products are not used in automotive applications where structural integrity is a critical factor. Recently, a series of glass fiber reinforced polyester resins have been developed which utilize the thickening characteristics of SMC, BMC, and the like, but which contain extremely high concentrations of glass fiber of substantial fiber length. For example, a series of polyester compositions containing from about 50 to about 75 weight percent of glass fibers have been developed. These polyester compositions can be used in making molded products but, typically, they do not possess the desirable surface characteristics which provide a "Class A" product. Their strength characteristics, which is supplied by the high concentration of long length glass fibers, provide unique markets for them. The fibers in these reinforced resins are either unidirectionally aligned, as from continuous filament tow, or are randomly distributed in long fibers in a polyester matrix, or from a combination thereof, to supply enhanced multidirectional strength to the molded article. The high glass fiber containing polyester resins are sheet molding compounds XMC or HMC (XMC and HMC are trademarks of PPG Industries, Inc.) and SMC-R-Fiber (from Owens Corning Fiberglas Corp., R is followed by a number which is the percentage of random fiber in the composite). These high fiber content resin systems are molded only by compression molding procedures.

Bulk molding processes using compression, transfer, or injection molding processes utilize extremely small fibers as reinforcement, i.e., fibers having lengths of about $\frac{1}{8}$ to $\frac{1}{4}$ inch, usually not larger than $\frac{1}{2}$ inch. Molded articles produced by these processes have weaker strength properties than a molded article produced by other molding techniques. For example, in making articles from sheet molding compounds, continuous filament glass fibers (i.e., continuous throughout the length of the article) are occasionally used. Chopped strands having fiber length of one to two inches are more commonly used. It is well known, that if the fiber length of the fibers employed in the reinforcement of a plastic is increased, at a given fiber concentration, the strength properties of the reinforced plastic will be significantly enhanced. Fiber length may not have much effect on the modulus of elasticity (i.e., stiffness) of a molded part. However, in making a molded part which has to withstand severe stresses, the fiber lengths should be as long as possible. It is also desirable to employ as much fiber as possible in making fiber reinforced composites which are to be employed as structural components of a load bearing structure. One of the deficiencies in making bulk molding compounds is that the composition cannot contain more than about 35 to 40 weight percent of glass fibers, since greater concentrations of glass increases the viscosity of the compounds to such an extent that they cannot flow adequately in the mold. Normally, in making bulk molding compounds, 15-30 weight percent of fiber is used. Compositions have been developed, in very special cases, wherein the fiber content reaches 50 percent. However, the fillers which would otherwise be incorporated in the bulk molding composition are taken out when the fiber content reaches 50 percent.

With sheet molding compounds, it is possible to increase the glass fiber concentration up to about 80 weight percent of the total weight of the compound. These are very special cases and represent recent developments in the art. In some instances, continuous filament glass fibers are provided within the sheet molding compound to maximize the strength properties of the resultant composite. Such materials are adequate for the most demanding structural components utilized in load bearing structures. Other compounds employ chopped glass fibers or glass fibers in combination with carbon fibers in a random oriented pattern to enhance the variability of the load bearing capabilities of the structural member being molded. Such materials have fiber contents ranging from about 50 to about 70 weight percent.

U.K. Patent Application GB No. 2015915A, published Sept. 19, 1979, describes a method for manufacturing an object of cured resin reinforced with glass fiber. This method comprises manufacturing a chopped glass fiber preform having substantially the same shape as the object, by supplying chopped glass fiber to a jet of finely-divided liquid containing a binder for the glass fiber and directing the jet with its contents of glass fiber and binder towards different parts of the surface of a former until a preform with the required amount of glass fiber has built up on the surface of the former. The bonded preform, so produced, is then placed in a closeable forming cavity of a mold. Uncured resin is then supplied to the forming cavity and then cured.

Water is the preferred liquid material in the jet. The water is stated to contain 8 percent by weight of polyvinyl acetate binder. After the former is provided with a fiber layer of the desired thickness, the process is interrupted and the preform is dried to remove water. The binder content in the preform, when the liquid has evaporated, is 3 to 15 percent of the total weight of the binder and glass fiber in the preform. Resin is then injected or sucked by vacuum into the closed forming cavity, or is supplied to the preform prior to closing the forming cavity. Molding is carried out under low pressure and at a low temperature, such as room temperature, or a moderately raised temperature. The resin starts to cure after about 10 minutes, and after about 30 minutes, curing is complete. In comparison, the present process is very rapid in that the resin cures in about 5 minutes and generally, in less than about 2 minutes after being injected into the mold.

In the recently published book "Reaction Injection Molding", edited by Walter E. Becker and published by Van Nostrand Reinhold Company, 1979, reaction injection molding (RIM) is described (on page 1) as involving the injection of a reactive liquid mixture-in most cases polyurethane or polyisocyanurate-into a closed mold where chemical curing and expansion take place. A finished part is removed in 1-10 minutes, depending on the chemical system, the part thickness, and the capabilities of the processing equipment.

The author describes polyurethane resin systems and states (on pages 44 and 45) that developments in the RIM area should lead to investigations of reinforcing the RIM elastomers with glass fibers (or other reinforcement fibers) since the fibers can be added to the liquid polyol mixtures and/or isocyanates for processing. The glass fiber/liquid mixtures are considerably more viscous than the liquids alone and are abrasive when placed in high shear with metal surfaces. The author then states that the key to the successful development of fiber reinforced RIM elastomers lies in the development of suitable processing equipment and techniques. It is then stated on page 45 of said book, that all initial investigations in the U.S. were carried out using 1/16 inch and 1/32 inch milled glass fibers. In the process for making the milled glass fibers, continuous glass filaments are hammer-milled into short lengths. FIG. 2-15 on page 46 shows a photomicrograph of 1/32 inch milled fibers and shows a distribution of sizes of the fibers which range from particles to maximum lengths of 1/32 inch.

Additionally, it is stated that the slope of the viscosity versus glass loading line (parts fiber/100 parts polyol) for a given polyol will be a function of the glass fiber length; the longer the length, the steeper the slope. In later work, it was found that the fibers could be just as easily added to the isocyanate side, the upper practical limit being about 40% of 1/16 inch fiber.

Therefore, the addition of glass fibers to the resin, as described in the book, prior to injecting into a mold, will result in non-uniform glass distribution and fiber orientation, which results in non-uniformity of properties, as in the SMC process detailed above. Further, use of fibers with lengths of 1/16 inch and less will not provide high mechanical properties.

Additionally, on pages 241 to 300 of the book, RIM equipment is discussed, and commercial RIM equipment is depicted in FIGS. 8-23 to 8-29 and 8-32 to 8-34, 8-36, 8-39 and 8-40. This RIM equipment comprises storage tanks for the polyol and isocyanate. Also, the RIM equipment contains high pressure metering units (described as one part of the two key elements of the RIM process) which take the highly reactive starting ingredients—polyol premix and isocyanate—and within a few seconds injects them into a mold. Further, the RIM equipment contains a high pressure impingement-type, self cleaning mixinghead (the second key element of RIM technology) which develops high velocity delivery of each stream to the mix chamber and develops turbulence in the mix chamber in order to intimately mix the two liquid streams.

THE INVENTION

This invention concerns a process for the rapid production of a fiber reinforced thermoset resin article, and apparatus therefor.

This invention allows the essentially exact replication of fiber reinforced thermoset resin articles in a sequential molding operation. The articles are essentially exactly replicated, since the variance from article to article is less than about 5 percent by weight.

Additionally, in comparision to the process described in U.K. Patent Appllication GB No. 2015915A, the present process is very rapid, in that the resin cures within about 5 minutes, and generally, in less than about 2 minutes, after being injected into the mold, whereas resin cure requires about 30 minutes in the process described in said U.K. Patent Application.

In the process of this invention, resin is injected into a heatable matched metal die mold and no mixing of resin and glass fiber occurs prior to injecting the resin into the mold. The molded articles produced by the process of this invention can contain large amounts of fiber, i.e. up to about 80 weight percent, and the fiber lengths may be greater than ¼ inch and can be as long as 2 or more inches; indeed, the fibers may be in the form of continuous filaments. Accordingly, the molded articles produced by the process of this invention have very good mechanical properties. Moreover, the process of this invention allows positioning of an interlocked mass of fibers in the mold. By positioning the fiber reinforcement within the mold in a known manner, fiber densitites within the framework of the molded article can be predetermined and maintained in the final molded product. This allows the molded article to have essentially equivalent mechanical properties in all directions, if desired, since random fiber orientation in the mold by prior position need not be disturbed during resin injection.

The present process concerns a multiplicity of steps, some of which are carried out in a sequential manner, whereas others are carried out concurrently. The sequence of steps will hereinafter be discussed.

In the first step of this process, a matched metal die mold that can be heated to effect cure of a thermosettable organic material is provided with an interlocked web composed of one or more fibers with a melting point or a glass transition temperature above about 130° C., and the mold is then closed. A liquid body of a thermosettable organic material (or composition) which eventually forms the thermoset resin matrix of the molded article is provided in an accumulator zone. This thermosettable organic material has a viscosity, as determined at 120° C. and measured in the absence of curing agents for the material, of less than about 50 centipoise. The organic material is maintained in the accumulator zone at a temperature below the temperature which initiates substantial curing of the material, in order to maintain its viscosity. Thereafter, the thermosettable organic material is injected into the mold to fill the mold cavity. The thermosettable organic material is heated in the mold to a temperature which is above the temperature at which cure of the thermosettable organic material is initiated. Once the material cures, the mold is opened and the molded article is removed therefrom. Curing is achieved typically within five minutes and preferably, within three minutes, and most preferably, within 1 to 2 minutes from the time the mold is filled with resin.

Thou9h molds made from reinforced thermoset resin materials are used to make FRP products, they do not conveniently withstand the temperature and pressure requirements of the process of this invention. Thus, it is necessary to employ a sturdy mold, such as one made of metal, which possesses the heatin9 capacity required for the process of this invention. A desirable mold for use in this invention is a heatable matched metal die mold.

It is important in the practice of this invention to prevent a degree of curing of the thermosettable organic material before it is introduced into the mold, which would significantly increase its viscosity. Advanced premature curing of the organic material before it is introduced into the mold could raise its viscosity undesirably high, causing the more viscous material on injection into the mold, to displace the positioned fibers, thereby disrupting uniform (or predetermined) fiber distribution in the resulting molded articles.

An important aspect of this invention is that the interlocked mass of the desired fibers be supplied to the heatable matched metal die mold in a form which, for the purposes of the molding process herein, the fibers are considered to be bonded to one another. That is, the individual fibers within the web are so fixed in the web structure that when the thermosettable organic materials are injected into the interior of the mold, these fibers are, at most, only slightly displaced from their original position, or displaced in a manner to achieve a predetermined pattern for the resulting molded article. As a result, the positioning of the reinforcement within the article is known and fiber densities within the framework of the article can be predetermined and maintained in the final molded product. This allows one to achieve a molded product having essentially equivalent mechanical properties in all directions, when a random fiber orientation is not disturbed during resin injection.

In order to prevent fiber displacement (i.e., movement and/or orientation) during resin injection, the forces within the fiber network should be greater than the forces which are required to displace the fibers. The required strength of the bond between the fibers forming a web is directly proportional to the viscosity of the resin, the velocity of the resin stream in the mold, and the size of the mold cavity, and inversely proportional to the amount of fiber in the mold.

The fibers, which are suitable for use in this invention as reinforcing agents, have a melting point or a glass transition temperature above about 130° C. These fibers include fiberglass, carbon fibers, aromatic polyamide fibers (such as aramid fibers sold by E. I. duPont de Nemours & Company, Wilmington, Del., under the trademark of Kevlar), metal fibers, such as aluminium and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ¼ inch, and the average length is at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

The molded article contains from about 15 to about 80, preferably from about 35 to about 80, and most preferably, from about 35 to 70 weight percent of fiber.

In the practice of this invention, fiberglass can be interlocked by bonding through the static charges built up between the glass fibers. These static charges act as an electrical force between the fibers and hold them together under the conditions at which the thermosettable organic material is injected into the mold. However, this is a relatively weak bonding system and should be used only when the viscosity, flow and character of the mold permits its use.

In many cases, the web is composed of a bulky bundle of fibers in the form of a batting that are arranged in either random form or in a prearranged form which exceeds the dimensions of a mold. This bulky bundle of fibers is added to the mold and the fibers are compressed when the mold is closed. The individual fibers within the compressed web are frictionally engaged to one another and this is sufficient, in most instances, to hold the fibers in the desired position during injection of the thermosettable organic material. However, some molds have vertical sidewalls, and when the mold is closed, the vertical sidewalls pass within a close proximity of one another. If the web thickness is greater than the distance between these two passing sidewalls, part of the uncompressed web is wiped from the sidewall to which it has adhered. In such instances, there will be less fiberglass in the molded product, particularly at the sidewall portions. This problem can be avoided simply by a technique which may be employed regardless of the shape and configuration of the cavity of the mold. This technique involves interlocking the fibers by applying a thermoplastic, a starch-like material, or a thermosetting material to the individual fibers, either prior to forming them into a web, or after they are in a web form. These materials wet enough of the surface of the individual fibers so as to create an adhesive effect between the individual fibers when the material dries or is cured. These materials are called binders. In addition, these materials could aid in the deposition of the fibers during the web forming process. Further, these materials can aid the flow of the thermosettable organic material through the fibrous web during the mold filling step. When using a binder, the web can be precompressed to the desired shape and configuration of the molded article. The compressed web, when it is introduced into the mold, does not extend at least beyond the sidewall of the mold. As a result, the compressed bonded web is more effective in reinforcing the sidewall portions of a part because when the mold is closed it does not at any time engage the surface of the web and does not adversely affect its physical integrity by wiping or shredding away a portion from the mold cavity.

The web can be compressed by a compacting device which is preferably heated, so that when pressed against the fluffy glass fibers, it can serve to drive out water when an aqueous binder system is used, or to cure a binder system. The compacting device exerts a pressure on the fibrous web which is sufficient to reduce its size in respect to at least the sidewall portions to that desired in the final molded article. For example, a part which would contain 45 weight percent of fiber, required a compaction pressure of about 18 psi to compress it to the desired thickness. When the level of glass is increased to 71 weight percent, the pressure required increased to about 208 psi.

Suitable materials which can be employed as binders for fibers. include polyvinyl acetate (either as a latex or from a solvent solution), starch, polystyrene solution, vinyl chloride containing polymer latices and solutions (such as copolymers of vinyl chloride and vinyl acetate), homopolymers of vinyl chloride, copolymers of vinyl chloride, vinyl acetate and maleic anhydride, copolymers of vinyl chloride, alkyl acrylates, polymethacrylates of low volatility with molecular weights above about 200, such as a bismethacrylate ester of a polyethylene glycol with a molecular weight of 600, prepared by reacting polyethylene glycol with a molecular weight of 600 with 2 moles of methacrylic acid, or the dimethacrylate ester of the 2-mole ethoxylate of bisphenol-A, and the like, ethoxylated polyamines, such as those used in the manufacture of wet strength paper, phenolformaldehyde resins (either as aqueous solutions, latexes, or solvent solutions), epoxy resins, silicone resins, silicone rubber, such as those which are vulcanizable at room temperature, polycrystalline waxes, solvent solutions of polyethylene, high molecular weight polyethylene oxide such as Polyox TM (sold by Union Carbide Corporation, New York, N.Y.), and the like. The particular binder is frequently chosen by the type of handling the web receives prior to the molding operation. The binders are used in amounts, typically, not exceeding about 20 weight percent of the web and, in most cases, not more than 15 weight percent of the web. Generally, the binder is used in amounts which are as small as possible to provide a cohesive web structure which can be subjected to pressure and kept in a compressed state when the pressure is released. These binders contribute essentially no reinforcement or strength properties to the ultimate molded articles produced by the process of this invention. However, they can prove in some cases to be useful in maintaining the cohesive interlocking of the web during the injection of the thermosettable organic material.

In a preferred embodiment of this invention, the amount of water in the fiber reinforcement and/or binder system should be such that no delamination or voids occur in the molded article. Water can be kept to a minimum by adequately drying the fiber reinforcement prior to injecting the resin and/or using a nonaqueous binder system.

The thermosettable organic materials that are employed in the practice of this invention are materials which have the capacity, upon being heated within the mold, to form a thermoset resin structure which acts as an effective matrix for holding the fiber within it and producing a composite structure having an acceptable strength and appearance. The thermosettable organic material typically contains at least two components. One component is the primary backbone constituent of the polymer and the other component forms the crosslinkage that is necessary to produce the thermoset property. As is well understood by those skilled in the art of forming thermoset resin articles, the structure of the thermoset polymer is a three dimensional network in which the polymer contains interlinking branched chains joining the backbone. Unsaturated polyester resins, for example, are widely utilized in making FRP. They can also be employed in the practice of this invention when properly formulated or made to provide the desired viscosity characteristics. These unsaturated polyester resins are co-reacted with an ethylenically unsaturated monomer, such as styrene. When styrene reacts with an unsaturated polyester resin, the resin is the backbone component of the polymeric structure. Styrene forms a cross-linking and branching unit by free radical catalysis. The styrene bonds to and branches out from the ethylenic unsaturation within the polyester to link with other branching from other polyester molecules and join the multiplicity of polyester molecules to form the three dimensional network. A relatively insoluble and relatively infuseable thermoset resin structure results. When this resin structure is used as a matrix for fibers, the fibers are locked within the framework of the molded article. The fibers reinforce the molded articles and provide strength properties. This technology is well developed in the art and understood by the skilled artisan.

In the practice of this invention, the thermosettable organic materials comprise a backbone component, such as an unsaturated polyester, an epoxy compound, or a vinyl ester such as the vinyl ester which is contained in Derakane (sold by Dow Chemical Company, Midland, Mich.)

However, the preferred thermosetting organic materials that are employable in the practice of this invention, are described in the following copending U.S. Patent Applications: Ser. No. 034,995, entitled "Maleate Half Esters of Organic Polyols and A Process for Their Production", filed by H. Gardner et al. refiled as continuation-in-part application Ser. No. 129,884 on Mar. 27, 1980, now U.S. Pat. No. 4,263,413; Ser. No. 034,996, entitled "Novel Bis Maleate Half Ester Containing Composition", filed by R. J. Cotter et al., now U.S. Pat. No. 4,229,559; Serial No 035,012, entitled "Composition and Process for Producing Molded Articles", filed by E. N. Peters refiled as continuation-in-part application Ser. No. 129,883 on Mar. 27, 1980, now U.S. Pat. No. 4,327,013; and Ser. No. 034,997, entitled "Polyester Resin Composition", filed by H. Gardner,the parent application of continuation-in-part applications Ser. No. 135,905, filed Apr. 14, 1980, now U.S. Pat. No. 4,294,751, and Ser. No. 136,421, filed Apr. 16, 1980, now U.S. Pat. No. 4,316,835; all of said applications Ser. Nos. 034,995, 034,996, 035,012 and 034,997 were filed on May 1, 1979.

The compositions of the inventions of these copending applications are not in all instances classifiable with any of the various categories of polymeric materials typically employed by the prior art in the formation of thermosetting resin compositions because the backbone component which is utilized in their manufacture, with one exception, is not a polymer. That sole exception is the composition described in Patent Application, Ser.

No. 034,997. In said Patent Application, Ser. No. 034,997, a polyester, better characterized as an oligoester, is end-blocked by maleate or fumarate radicals. However, the half esters and poly(acrylates) described in said Patent Applications, Serial Nos. 034,995; 034,996; and 035,012, may be equated solely for the purposes of the discussions herein with the typical unsaturated polyester resins employed by the prior art. However, in each of said U.S. patent applications, Serial Nos. 034,995; 034,996; 035,012; and 034,997, the backbone forming component of the eventual polymer is of much lower molecular weight than the conventional unsaturated polyester resin and consequently, they are more readily capable of meeting the viscosity requirements and overall objectives of this invention. The materials described in said Patent Applications are cross-linked by a coreaction with an ethylenically unsaturated monomer, such as styrene and the like. The materials which are described in said copending U.S. patent applications Ser. Nos. 034,995; 034,996; 035,012 and 034,997 may be employed to the utmost advantage when used in this invention. These compositions possess extremely low viscosities and consequently achieve maximum flow through the mold and have little adverse effect upon the structural integrity on the fibrous web structure within the mold. The compositions yield composite structures having very desirable physical properties and appearance.

These applications disclose the following:

(A) U.S. patent application, Ser. No. 034,995, entitled "Maleate Esters of Organic Polyols and A Process for Their Production" describes a composition comprising a homogeneous liquid mixture of (a) a maleate half ester of an organic polyol characterized by the following empirical formula:

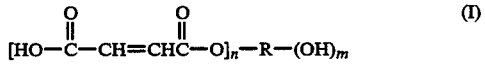

(I)

wherein n is a number having an average value of about 1.8 to less than about 4, m is equal to the free valence of R less the average value of n, R is the hydroxyl-free residue of an organic polyol which contained from 2 to 4, inclusive, hydroxyl groups OH, in the formula (I), (b) maleic anhydride, (c) an ethylenically unsaturated monomer which forms a liquid homogeneous mixture and is copolymerizable with (a) and (b), and (d) a basic compound.

The composition additionally contains a free radical curing catalyst. However, compositions without the basic compound are also suitable herein.

The half ester (I) is formed by the reaction of maleic anhydride and an organic polyol. The reaction #product contains at least 1.8 ester groups. If the polyol contains 4 hydroxyl groups, the reaction product can possess up to 4 maleate half ester groups. If the number of half ester groups is less than the number of hydroxyl groups available from the polyol, the reaction product will contain residual hydroxyl groups. Typically, the maleic anhydride content of the composition does not exceed a total of about 10 mole percent of the amount of maleic anhydride employed in producing the half ester.

In preparing this composition, if the ethylenically unsaturated monomer is present during the reaction between the maleic anhydride and the organic polyol, then the reaction temperature should be below the temperature at which maleic anhydride will copolymerize with the ethylenically unsaturated monomer. This temperature is generally below 60° C.

If the composition is prepared above about 60° C., then it is desirable to first react the maleic anhydride and the polyol. After about 70 percent of the maleic anhydride has reacted, the ethylenically unsaturated monomer is added. The temperature of the liquid body is rapidly reduced to the desired temperature or to room temperature. The lower temperature is optional and is dependent upon the method used to carry out the process, the type of equipment being used and the manner in which the composition produced will be utilized.

The base can be added to either the solution of polyol, maleic anhydride, and unsatuarated monomer at a temperature below 60° C. or to a mixture of the polyol and maleic anhydride alone at a temperature above about 40° C. The formation of the half ester is an exothermic reaction. If the latter reaction mode is used, it is desirable to cool the reaction mixture before adding the unsaturated polymerizable monomer to the reaction mixture. This is desirably carried out at temperature below about 120° C. and after about 70 percent of the maleic anhydride has reacted.

The basic compound is selected from an amine, a metal salt of an alcohol or carboxylic acid, or a metal oxide or hydroxide.

(B) U.S. patent application, Ser. No. 034,996 entitled "Novel Bis(Half Ester) and Compositions Containing the Same", describes a composition comprising:

a half ester characterized by the following empirical formula:

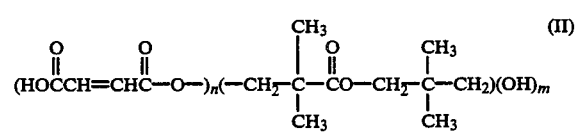

(II)

wherein n is a number having an average value between 1.7 and 2, and m is equal to 2−n. Also described is.a composition comprising said half ester, maleic anhydride and an ethylenically unsaturated monomer, wherein at least 75 mole percent of the half ester is in the maleate form. The composition additionally contains a free radical curing agent.

In preparing the composition, if the unsaturated monomer is present during the reaction between the maleic anhydride and 2,2-dimethyl-3-hydroxypropyl 2,2-dimethyl-3-hydroxypropionate, then the reaction temperature should be below the temperature at which maleic anhydride will copolymerize with the unsaturated monomer. A temperature of about 60° C. is the maximum temperature to use when the unsaturated monomer is present during the reaction between maleic anhydride and 2,2-di-methyl-3-hydroxypropyl 2,2-dimethyl-3-hydroxypropionate.

If the composition is prepared above about 60° C., then it is desirable to first react the maleic anhydride and the 2,2-dimethyl-3-hydroxypropyl 2,2-di-methyl-3-hydroxypropionate. After about 70 percent of the maleic anhydride has reacted, the ethylenically unsaturated monomer is added. The temperature of the liquid body is rapidly reduced to the desired temperature or to room temperature. The lower temperature is optional and is dependent upon the method used to carry out the process, the type of equipment being used, and the manner in which the composition produced will be utilized.

A basic compound such as amine or tin catalyst can be used. The catalyst can be added to the solution of the 2,2-dimethyl-3-hydroxypropyl 2,2-dimethyl-3-hydroxypropionate, maleic anhydride and ethylenically unsaturated monomer at a temperature below about 60° C. or to a mixture of 2,2-dimethyl-3-hydroxypropyl 2,2-dimethyl-3-hydroxypropionate and maleic anhydride at a temperature above about 40° C. The formation of the half ester is an exothermic reaction. If the latter reaction mode is used, it is desirable to cool the reaction mixture before adding the unsaturated monomer to the reaction mixture. This is desirably carried out at temperatures below about 110° C. and after 70 percent of the maleic anhydride has reacted. It is desirable that not more than about 25 mole percent of the maleate half ester is converted into fumarate half esters and preferably, not more than about 15 mole percent.

(C) U.S. patent application, Ser. No. 035,012, entitled "A Poly(acrylate) Containing Composition and Process for Producing Molded Articles", describes compositions containing poly(acrylates) characterized by the following empirical formula:

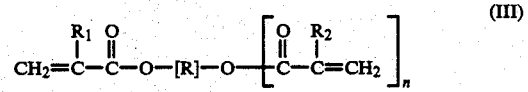

(III)

wherein R is the hydroxyl-free residue of an organic polyhydric alcohol which contained alcoholic hydroxyl groups bonded to different carbon atoms, $R_1$ and $R_2$ are each independently one of hydrogen or methyl, and n is 1 to 3. The composition additionally contains an ethylenically unsaturated monomer and an elevated temperature free-radical curing catalyst capable of effecting the co-reaction of the poly(acrylate) and monomer.

(D) U.S. patent application, Ser. No. 034,997, entitled "Polyester Resin Composition", describes a composition comprising a mixture of: (a) a polyester of the following formula:

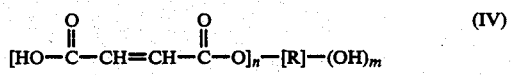

(IV)

wherein n has an average value between 1.5 and 2, m is 2−n, R is the residue of a predominantly hydroxyl terminated polyester having a molecular weight not exceeding about 1500 and obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, and mixtures thereof, and mixtures of ethylene glycol and said diols, with a dicarboxylic acid or anhydride selected from the class consisting of maleic acid and anhydride, fumaric acid, orthophthalic acid and anhydride, isophthalic acid, terephthalic acid, carbic acid and anhydride, and mixtures thereof, (b) maleic anhydride, and (c) an ethylenically unsaturated monomer which forms a homogeneous mixture with, and is copolymerizable with (a) and (b).

The polyesters are prepared by a stepwise process. The first step is the formation of a relatively low molecular weight polyester which is predominantly or essentially hydroxyl terminated. This polyester is thereafter reacted through the hydroxyl groups with maleic anhydride. This results in carboxylic acid termination of a substantial portion of the polyester, ester formation with these hydroxyl groups, and provides ethylenic unsaturation at the ends of the polyester chain. A small portion of the maleic anhydride remains unreacted due to the equilibrium nature of said reaction. This reaction mixture is thereafter mixed with an ethylenically unsaturated monomer. This monomer is capable of both forming a homogeneous mixture with and is copolymerizable with the carboxyl terminated polyester and maleic anhydride.

The predominantly hydroxyl terminated polyester used to produce the carboxyl terminated polyester is typically prepared from (a) a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate and mixtures thereof, and mixtures of ethylene glycol and the aforementioned diols, and (b) a dicarboxylic acid or anhydride selected from the class consisting of maleic acid and anhydride, fumaric acid, orthophthalic acid and anhydride, isophthalic acid, terephthalic acid, carbic acid and anhydride, and mixtures thereof. The diol and dicarboxylic acid or anhydride are heated until a polyester is formed possessing an acid number of less than about 15, preferably less than about 10 and most preferably, less than about 5. When the molar ratio of diols to dicarboxylic acids is greater than about 1.5, the hydroxyl number is typically in excess of about 65, and most desirably in excess of 100. Hydroxyl numbers for the hydroxyl terminated polyester can be as high as 250 and greater. Polyester esterification catalysts such as amines or tin compound may be used to increase the rate of formation of the polyester.

The poyester of formula (IV) is conveniently prepared by reacting the predominantly hydroxyl terminated oligomer with maleic anhydride in a stoichiometric ratio of one mole of hydroxyl per about 0.75 to about 1.2 moles of maleic anhydride. A catalyst may be used to carry out this reaction. These catalysts include tin compounds and amine compounds.

The disclosures of these copending U.S. Patent Applications (A to D) are incorporated herein by reference. All portions of these applications provide relevant data for the most optimum utilization of the process of this invention and can be employed in the practice of this invention in accordance with the teachings of those applications, without exception.

Also, a resin composition of a reactive ethylenically unsaturated resin, and a monomeric diacrylate and dimethacrylate ester of a polyglycol as described in U.S. Pat. No. 3,222,421, may be used herein.

As stated previously, each of the thermosetting resins contains a cross-linking component. Epoxy resin is cross-linkable by the use of one or more amines, polyamines, anhydrides or polyols, as well as other compounds which will provide an active hydrogen to open up the oxirane moiety of the epoxy base component. Polyester resins are cross-linked with ethylenically unsaturated monomers, such as styrene, as well as a host of other materials, many of which are described in copending U.S. Patent Applications (A to D), supra. Vinyl esters such as Derakane, previously mentioned, may be cross-linked with monoethylenically unsaturated monomers. Phenolic resins are cross-linked by addition of heat and effecting a condensation reaction by the condensation of residual methylols in a resole type resin or by reacting formaldehyde or a methylene precursor with a novalak-type resin in the presence of an acid or alkaline catalyst.

An advantage of the process of this invention is that it can be operated without venting any air contained within the mold when the thermosetting organic materials are injected into the mold.

In the present process, the air contained in the mold can, under the operating conditions of the process, be materially absorbed into the cured resinous article. This can be accomplished by injecting the resin under a pressure of from about 10 to about 200 atmospheres. This is sufficient to cause any air to be absorbed by the resin. Additionally, the air contained in the mold can be driven from the main cavity where the desired molded product is being made. The air is driven into an adjacent pocket within the framework of the mold outside the mold cavity. The area where the male and female portions of the mold come into contact beyond the mold cavity can be termed the "parting line". In constructing a mold, the distance between the male and female halves, at the parting line of the mold, can be so close that it is possible that only air will move into the parting line and resin is precluded from passing beyond the main cavity of the mold through the parting line.

In another embodiment of this invention, air can be evacuated from the mold cavity prior to injecting the resin into the mold cavity.

In a most desirable embodiment of this invention, the liquid body of thermosettable organic material has a viscosity at room temperature (about 23° C.) of about 5 to less than about 200 centipoise. These organic materials, typically, have a viscosity which is less than about 50 centipoise, usually less than about 30 centipoise and, in many instances, less than about 15 centipoise, when their temperature is at least at the temperature of the mold. The viscosity of the liquid body of thermosettable material within the mold is so low that it is nearly water-like in flow characteristics and generally does not affect the position of the individual fibers of the web located within the mold. Further, due to its low viscosity, it is easily injected to the extremities of the mold and readily fills the mold. Also, such low viscosity materials absorb gas, such as air contained within the mold, and thus the degree of venting which is required in this molding operation is substantially minimized or eliminated.

Because of the low viscosity of the thermosettable materials, it is possible in the practice of this invention to produce thermoset resin articles which contain from about 15 to about 80 weight percent of fibers, based on the weight of the molded article. These higher concentrations of fibers in making FRP molded articles have been produced heretofore only by compression molding, a very time consuming and rigorous molding procedure.

It is known in the art that in order to produce high performance reinforced thermoset articles it is important to form a bond between the surface of the reinforcing fiber and the matrix resin. In the present process, such a bond is formed in a very short period of time in comparison to existing commercial processes which require a longer period of time for the bond formation.

The term "thermosettable organic materials" as used herein is intended to encompass both polymeric and nonpolymeric systems which upon further reaction result in the formation of a thermoset article. For example, unsaturated polyester resins of the prior art are polymeric materials which by themselves do not effectively undergo cross-linking in the presence of a free-radical catalyst to form a thermoset material. They must be combined with a monoethylenically unsaturated material, such as styrene, to form a thermoset resin. The combination of, for example, styrene and the unsaturated polyester resin is termed by the art a resinous material, although that characterization is not quite accurate. However, in the process of this invention, the kinds of materials which can be used to form the thermosetting resins can be each monomeric materials, see the disclosures of copending U.S. patent applications, Ser. Nos. 034,995; 034,996 and 035,012 described, supra. However, in the case of copending U.S. patent application Ser. No. 034,997, an unsaturated polyester can be one of the resin materials. As an alternative to the expression "thermosettable organic materials", reference is made to the term "resinous materials" indicating that they will eventually form the thermoset resin which is the ultimate objective herein. Thus, where the term "resinous materials" is employed in the instant claims or in this disclosure, it is not intended that the term should be limited to a combination of materials which are regarded to be resinous per se, but is also intended to encompass a material or combination of materials that form a thermoset resin upon curing.

One of the deficiencies of a thermoset resin is that it shrinks during curing. Each of the various thermoset resins shrink to some degree and, in general, thermoset resins shrink from about four to about twelve volume percent of the volume of the mold. As a result, the molded article will not have a surface which accurately replicates the interior surface of the mold. In making conventional molded parts from sheet molding and bulk molding compounds, shrinkage has been eliminated by adding thermoplastic additives to the resin. These thermoplastic additives are low profile additives. These low profile additives are incomparible with the resin during the curing process. Monoethylenically unsaturated monomers, such as styrene, contained in the formulation and dissolved in the low profile additive, volatilize during the curing of the resin and thereby cause the thermoplastic additive to expand. The total thermosetting resinous composition expands during the curing process and the molded article, in many instances, exactly replicates the mold. When the molded article replicates the mold, and if the mold surface is highly polished and uniform, the molded product can have surfaces which are smooth and uniform. The molded article can be easily painted to give the appearance of highly polished sheet steel.

In the practice of the process of this invention, a molded part as taken from a mold can be made to replicate the mold. This is effected without the addition of a component which is basically incompatible with the resin or is a low profile additive. The mold is replicated in this invention by including or adding to the surface between the shrunken molded part and interior mold surface, an additional thermosettable resin, or a thermoplastic resin, or an elastomeric polymer. This resin may be the same as that used to form the molded part or it may be a different resin.

Thus, after the resin in the mold has undergone gelation, or the matrix of the thermoset article has shrunken, additional thermosettable organic marerial, or a thermoplastic, or an elastomeric material can be injected into the mold. The void space existing in the mold between the molded article and the walls of the mold cavity is free of any fiber other than small amounts, if any, of protruding fibers from the article. The additional material fills up the void space and produces a molded product with a surface that replicates the interior surface of the mold.

This material which is later injected into the mold does not have to contain fiber reinforcement. The resin which is used as the matrix resin for the molded article may not possess the desired coating qualities, therefore, this invention allows for the addition of a different composition to the mold to form a surface layer which makes a finished product that replicates the mold. Other thermosettable organic materials which can be used for this purpose and which possess excellent coating and strength properties include polyester, polyurethanes, vinyl ester resins (such as Derakane, supra); ethylenically unsaturated polyester resins which contain rubber modifiers to increase their toughness, epoxy resins containing rubber modifiers to increase their toughness, the esters and the poly(acrylates) characterized in U.S. patent applications, Ser. Nos. 034,995; 034,996 and 035,012, supra. Useful thermoplastic materials include polysulfone polyethers, polyarylates, polycarbonates, polyacrylics, polyvinyl chlorides, polyurethanes, as well as many other polymers. Useful elastomeric materials include polyurethanes, polybutadienes, neoprene, chloroprene, as well as many other polymers.

However, there are occasions in the manufacture of molded articles that after the initial molding, the degree of shrinkage is not uniform about the article and portions of the article will be in contact or essentially in contact with the mold surface. In such a case, it is desirable to break the mold and expand it about a millimeter or less in order to achieve a uniform and/or complete coating around the molded article. (*Plastics World*, March 1978, pages 48–51 discusses an in-mold coating technique developed by General Motors and General Tire and Rubber Company).

One of the more significant aspects of this embodiment of the present invention is that it simplifies formulation of the matrix resin since a low profile thermoplastic additive is not necessary in order to enhance the mold replicating capabilities of the molded part. By relying upon the natural shrinkage of the thermosettable organic materials as they cure, the void space between the article and the surface of the mold which is provided, allows additional amounts of thermosettable organic materials or another materials to be added to the mold whereby to coat and protect the surface of the molded article. Replication of the mold occurs when the void space is filled with such material. Where the degree of shrinkage is not great enough to allow a uniform coating about the surface of the article, then the mold should be broken to enlarge the cavity sufficient to allow introduction of additional materials to effect the desired surface treatment.

In the typical case, if the mold is not cracked (or broken open), then the overall mold time cycle is not changed, since the second material usually cures very rapidly. A mold cycle of two minutes is typical for injection of both organic materials. Sometimes it may be desirable to increase the mold cycle time, typically by not more than about one minute. The technique of this invention materially accelerates mold cycle time in achieving Class A molded parts.

In another aspect of this invention, the injection pressure is maintained beyond the time required to initially fill the mold cavity so that when the resin cures and shrinks, additional resin flows into the mold cavity to fill the void created by shrinkage of the initial resin. The resin flow is terminated and the mold is left closed for an additional period of time, generally from about 1 to 2 minutes, to allow the resin to completely cure. In another embodiment, the resin flow is terminated after the mold cavity is filled with resin until the resin shrinks. Additional resin is then added to fill the void created by the resin shrinkage.

In the process of this invention, webs made of chopped strands of fibers, particularly fiberglass, carbon fibers and aromatic polyamide fibers, are used. In making the web, a continuous filament of the fiber or fiber combinations can be used. Since the fibers are not injected with the resin into a mold, the overall viscosity of the thermosettable organic material supplied to the mold to form the resinous matrix is not hindered by the higher viscosity that the inclusion of fibers in the material would produce. In this respect, this invention is more desirable than the bulk molding compound procedures which require that the requisite fiber content be present in the unsaturated polyester resin. It is possible in accordance with the process of this invention to use fiber concentrations in amounts of up to about 80 percent in the molded article. The only controlling factor herein is that the thermosettable organic material possess a viscosity which permits it to flow through and around the cavity of the mold in which the high fiber loading resides. The resins which have low viscosities and can be effectively employed in the manufacture of molded articles having such high fiber content are those which are characterized in copending U.S. patent applications, Ser. Nos. 034,995; 034,996; 035,012 and 034,997, discussed previously.

An advantage of the process of this invention is that a combination of a liquid material that can effectively enhance the overall performance of the resultant molded composite can be incorporated in the mold cavity by a rapid injection system. The thermosettable organic material used to form the thermoset resin composite structure is provided in an accumulator. In a second accumulator zone or even a third accumulator zone, an additive may be provided which is supplied for improving product qualities of the composite. These additives include elastomeric toughening agents such as rubber and polyurethane elastomers which enhance the impact properties of the thermoset article; high viscosity thermosetting materials which provide enhanced strength properties or hydrolytic stability to the composites, such as cycloaliphatic epoxides and the like; thermosetting resinous materials which enhance the heat distortion characteristics of the thermoset articles, such as phenolic resins; high molecular weight and cross-linkable unsaturated polyester resins (more cross-linkable than the backbone polyester resin); high temperature epoxy resins; fiber surface treating agents such as silicone coupling agents which can be dissolved in, for example, styrene monomer or other cross-linking components of the resin system. These additives are fed from a second accumulator zone in combination with the thermosettable organic materials being injected into the mold from the first accumulator zone.

The mold employed herein is a heatable matched metal die mold which means that it has the capacity of being heated during the molding step. Preferably, the matched metal die mold is chrome plated. It has been found that chrome plating the mold helps reduce any sticking of resin to the mold surface and reduces formation of scum on the mold surface.

Heating of the mold is provided by heating jackets on the mold which are heated either by hot gases or hot liquids, and/or electric heaters can be inserted as cartridges in the mold structure. Any one of these techniques are convenient and quite suitable in the practice of this invention. However, the mold can be cooled after the product is made and before it is removed from the mold. In this case, the mold is reheated when it is closed and prior to the next injection of the thermosettable liquid. There is no economic advantage in going through a cycle of mold heating and cooling. Thus, the preferred method of operating the present process is to maintain the mold at a constant temperature throughout the various molding cycles. The temperature at which the mold is maintained is dependent upon the temperature at which the cure of the thermosettable organic materials supplied to the mold is initiated to produce a thermoset resin composition. The initiation temperature is the temperature at which the components of the thermosettable organic materials inter-react to effect an exothermic reaction which cures the materials to a thermoset resin. For example, those materials described in copending U.S. patent applications Ser. Nos. 034,995; 034,996 and 34,997 do not utilize a polymeric component as one of the starting materials that make up the thermosettable organic materials. All of the materials are monomeric in nature and are converted into a thermoset resin and polymers only after reaction occurs.

The mold temperature which is sufficient to initiate reaction resulting in a thermosettable organic resin is dependent upon the particular thermoset organic materials. Some of these materials undergo curing and reaction at temperatures as low as 50° C. while others require temperatures of at least 150° C. In considering the exothermic temperature of the reaction, it is desirable to utilize a mold temperature which nominally exceeds the initiation temperature by at least 10°-20° C., thus insuring a rapid initiation and a quick increase in the exotherm to produce a cured product in a minimum amount of time. Moreover, catalysts, initiators, etc., are generally added to the thermosettable materials. The type of catalyst or initiator, as well as any promoter or activator supplied therewith will greatly deter- mine mold temperature.

Some catalyst and activator combinations can be utilized in unsaturated polyester resins to effect cure at room temperature. In the practice of this invention, such a curing system may be used. However, in order to achieve the rate of cure which is desirable in the practice of this invention, especially the initiation and generation of the cure, should be materially enhanced. Thus, the mold temperature will be over room temperature, possibly 40°-150° C. above room temperature, in order to produce a molded article within a molding cycle of approximately 2 minutes or less.

The injection pressure, can vary from about 2 to about 200 atmospheres during the molding operation. Higher and lower pressures are also contemplated.

In the present process, the conventional commercial RIM equipment described, supra, may be modified to supply resin to the matched metal die mold. For example, both storage tanks of the RIM equipment can be filled with the same resin. Also, a single tank of the RIM equipment could be used with the other tank being blocked off. Such would constitute an accumulator as herein defined.

A further embodiment of this invention is a novel apparatus for producing fiber reinforced thermoset resin articles. The desired apparatus of this invention comprises (a) a heatable matched metal die mold containing one or more cavities therein with means for opening said mold to expose such cavities and closing the same, and means for controlling the injection of a thermosettable organic liquid to said cavities when the mold is closed, (b) means associated with said mold whereby one or more fibers in the form of an interlocked mass of fibers are provided in a portion of the cavities thereof when the mold is open to expose such cavities, and prior to the injection of the thermosettable organic liquid to such cavities when the mold is closed, (c) accumulator means associated with said mold which can contain a thermosettable liquid transportable to means for controlling injection of said thermosettable organic liquid to such cavities, (d) cooling means associated with the means for controlling the injection of such liquid to such cavities whereby the temperature of the liquid in such injection means is maintained substantially below the temperature of the mold.

The term "cavities" herein means either one cavity or a multiplicity of cavities in the mold.

The apparatus as described herein can be provided with a multiplicity of accumulator means, each capable of independent and simultaneous operation. The accumulator means can include a vessel with a piston applying pressure to the material, or a vessel with gas pressure applying pressure to the resin. The accumulator means may also comprise a pump which is controlled to deliver the resin to the mold in the proper rate, pressure and quantity.

The apparatus can also contain means for the expansion of the mold following fabrication of a fiber reinforced article in the mold in order to provide the surface coating feature of this invention in a subsequent but related step.

In a further embodiment of this invention, means are provided in the apparatus to supply a sufficient pressure to the accumulator means whereby the thermosettable liquid is transported from the accumulator means to the means for controlling injection to such cavities, and into such cavities to fill the available space therein. The total injection pressure is generated in the accumulator. Once the mold is filled with material, the pressure in the mold is essentially the same as that in the accumulator.

The means for providing the mass of fibers to the mold cavity may be an automated means, such as a robot, capable of laying fiber on the mold surface in a predetermined pattern and amount.

In order to facilitate the understanding of the aforementioned process and apparatus, reference is made to the Figures herein which characterize specific embodiments of both the process and the apparatus. It is not intended that the scope of the process and the apparatus as hereinabove defined be restricted by the specific materials and equipment which are characterized in the Figures since they are intended for illustration purposes only.

Figure 2A:
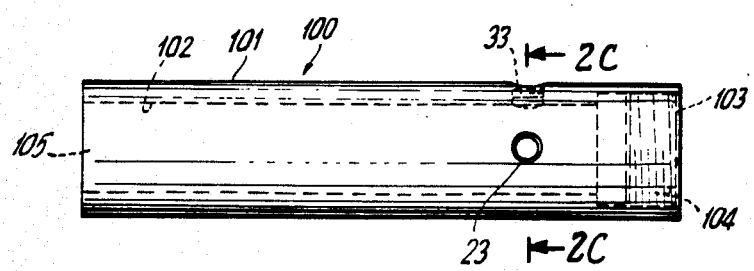
FIG. 2A is a side elevation of a cooling jacket sleeve.
Figure 2B:
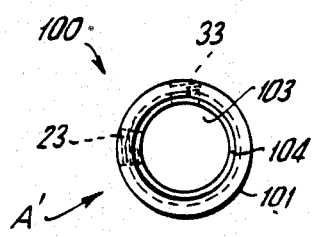
Figure 2C:
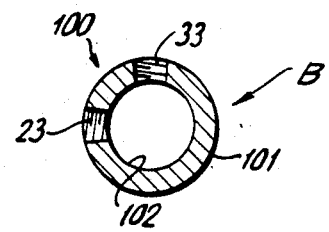

FIGS. 2A-2C one a side, cross-sectional and end views of a cooling jacket sleeve that is employed as a component in the means for controlling the injection of thermosettable liquids into the mold cavities.

FIG. 3A is a side elevation view of the injection nozzle.

FIG. 3B is a longitudinal cross-sectional view of an injection nozzle for controlling the injection of thermosettable liquids into the mold cavities. Also depicted are end views and several cross-sectional views of the nozzle. FIG. 2 describes a cooling jacket for the injection nozzle of FIG. 3.

FIGS. 3C–3F are cross-sections of the injection nozzle viewed axially.

Figure 4:
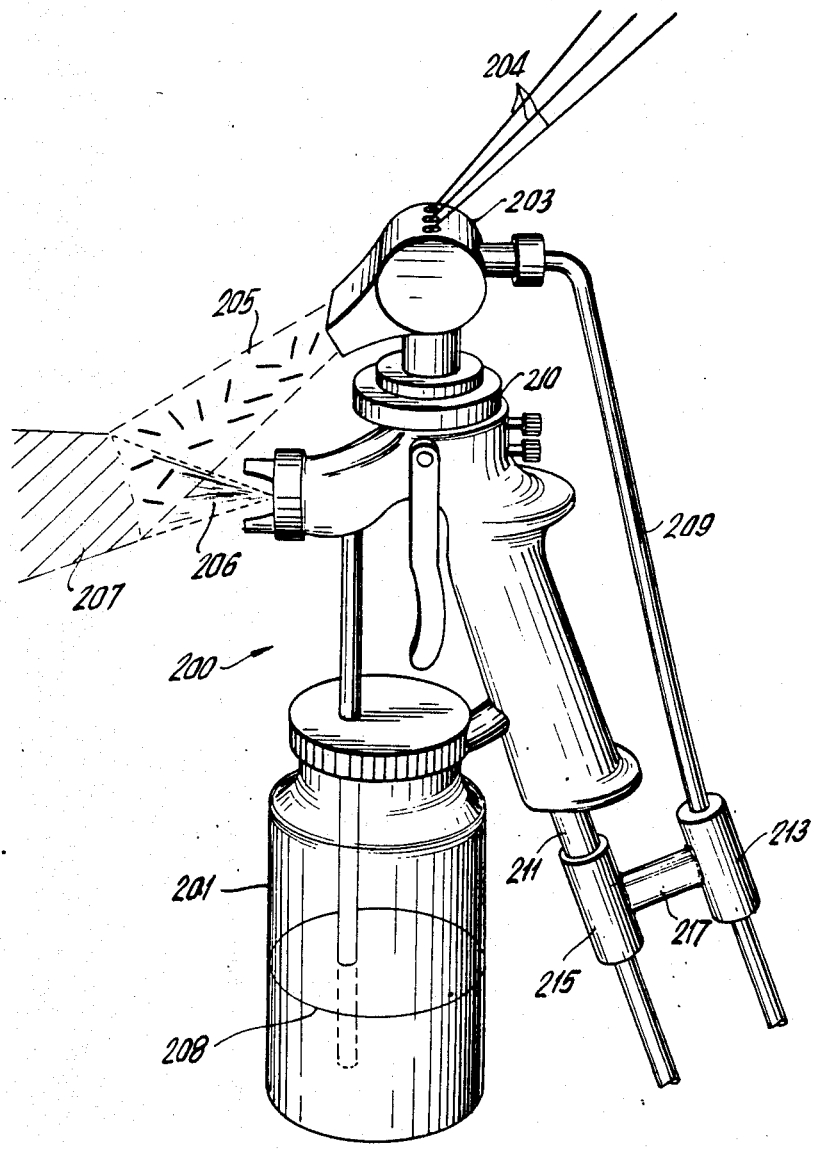

FIG. 4 depicts a partial perspective view of a spray assembly for producing chopped fiber strands and staple which is fed into a spray of binder and this combination is supplied to a surface on which the web is formed.

Figure 5B:
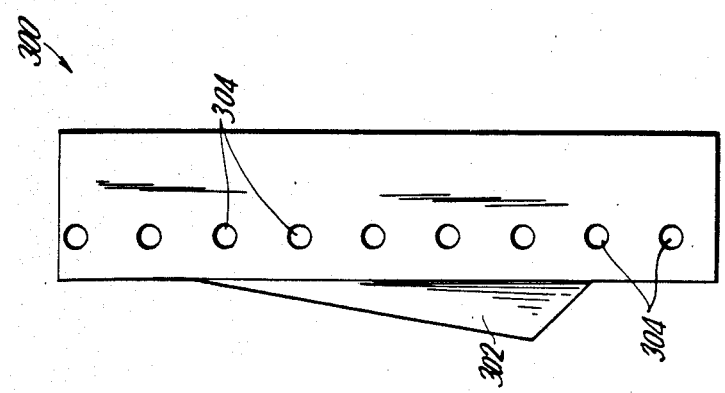
Figure 5A:
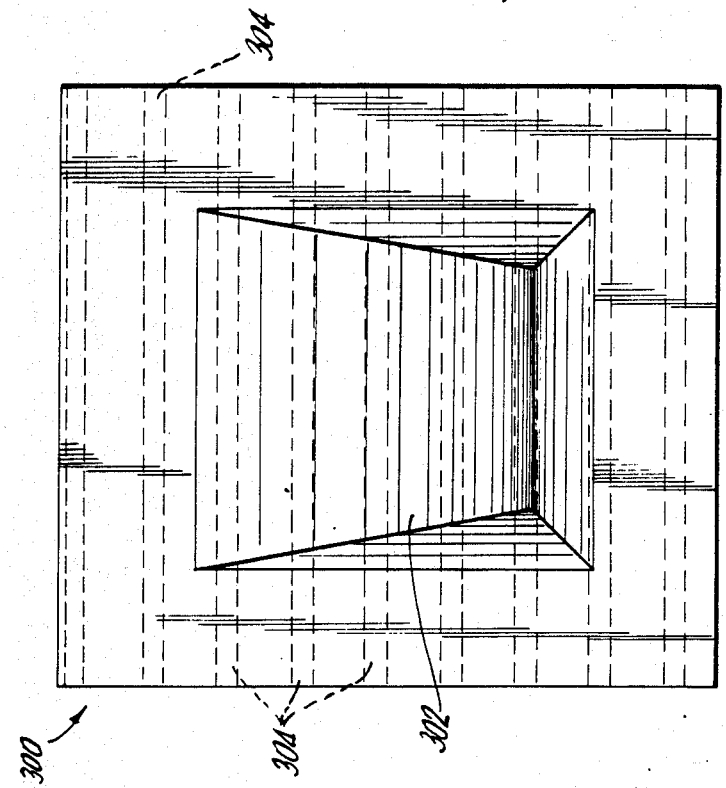
Figure 6B:
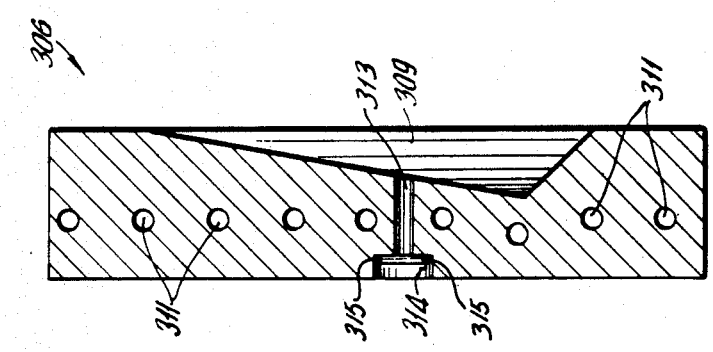
Figure 6A:
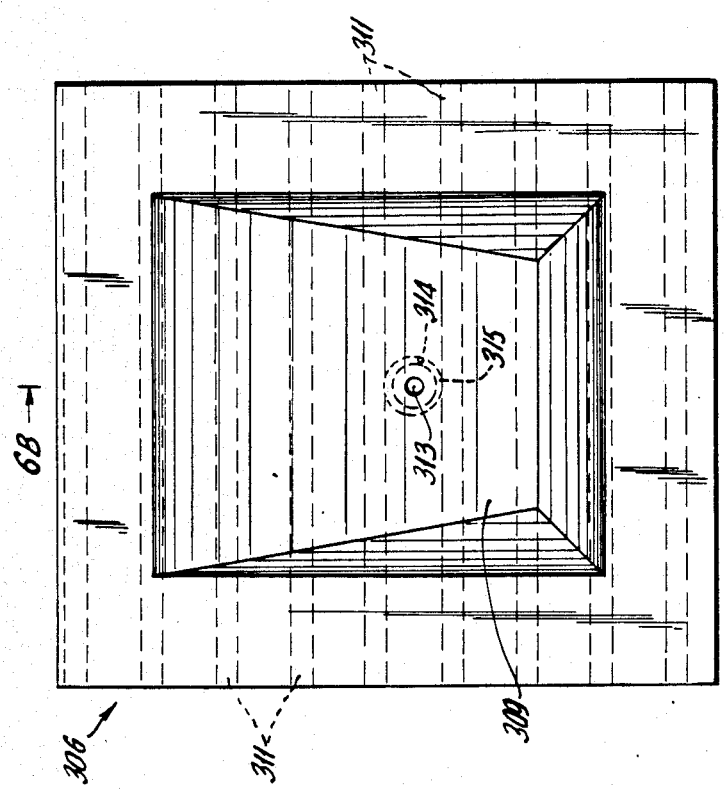

FIGS. 5 and 6 characterize a heatable matched metal die mold. FIG. 5A shows a top view and FIG. 5B, a side view of the male die and FIG. 6A shows a top and FIG. 6B, a side view in section of the female die.

Figure 7:
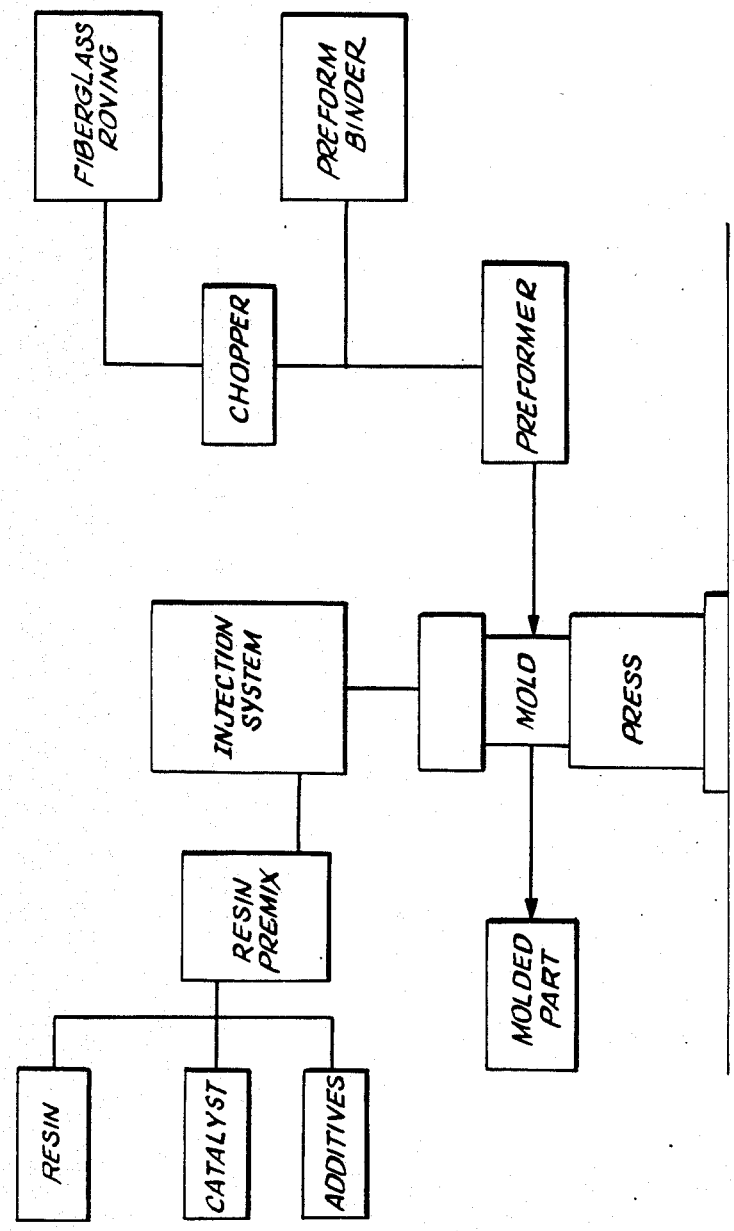

FIG. 7 is a block schematic diagram of the elements of a molding system which may be used herein.

Figure 8:
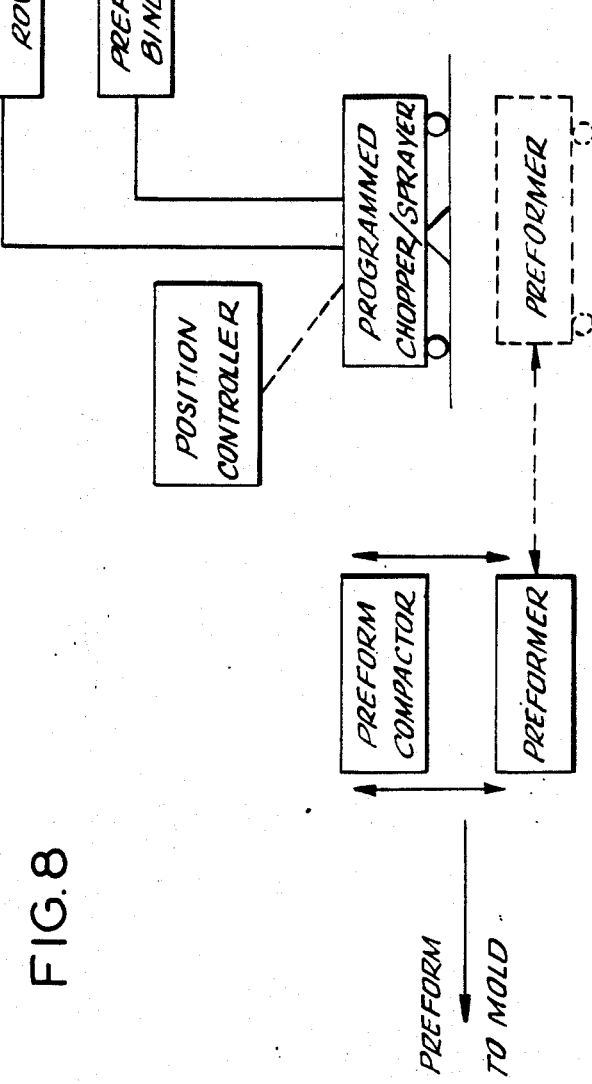

FIG. 8 shows a block diagram of the elements of a web forming system.

Figure 9:
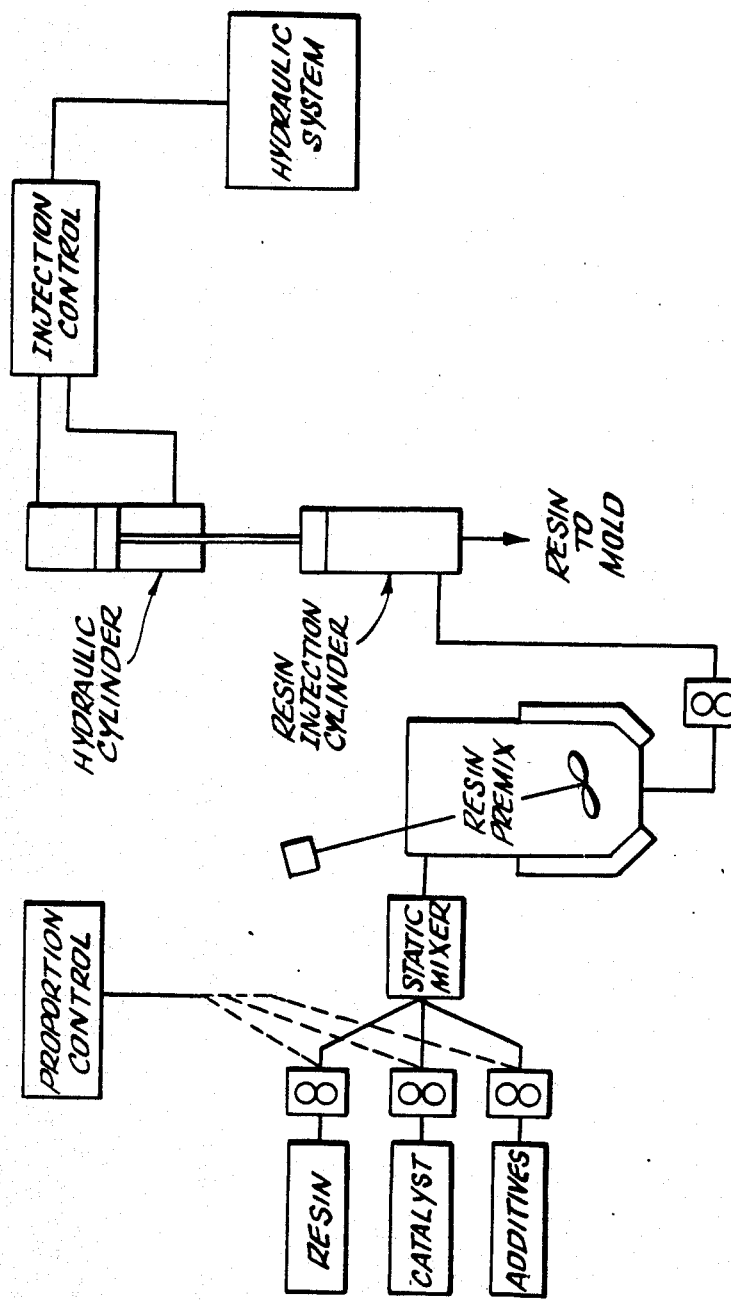

FIG. 9 shows a block diagram of the elements of a system for making thermosettable organic materials and an injection means for injecting the materials into a mold.

Figure 10:
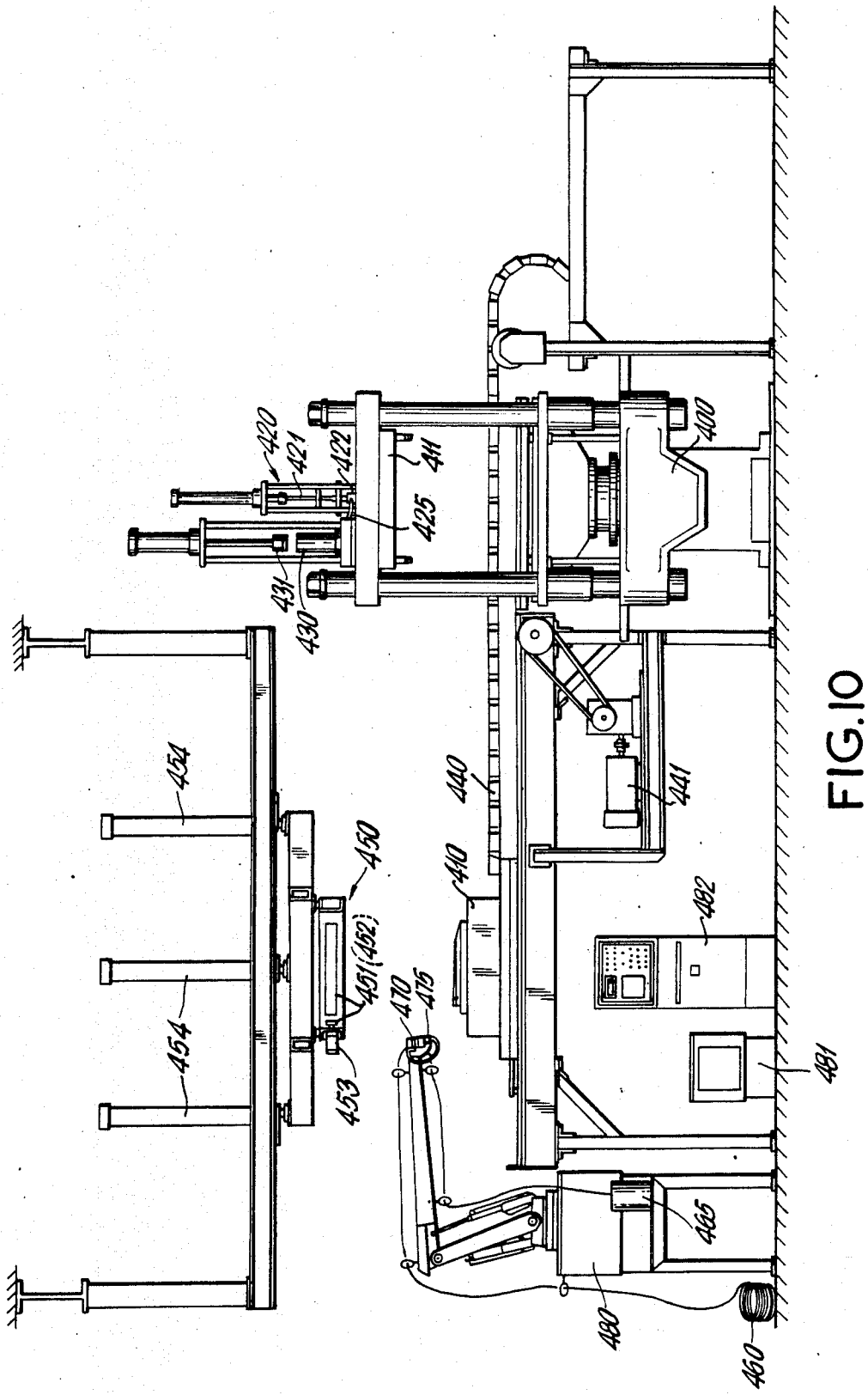

FIG. 10 shows an automated molding system.

Figure 11:
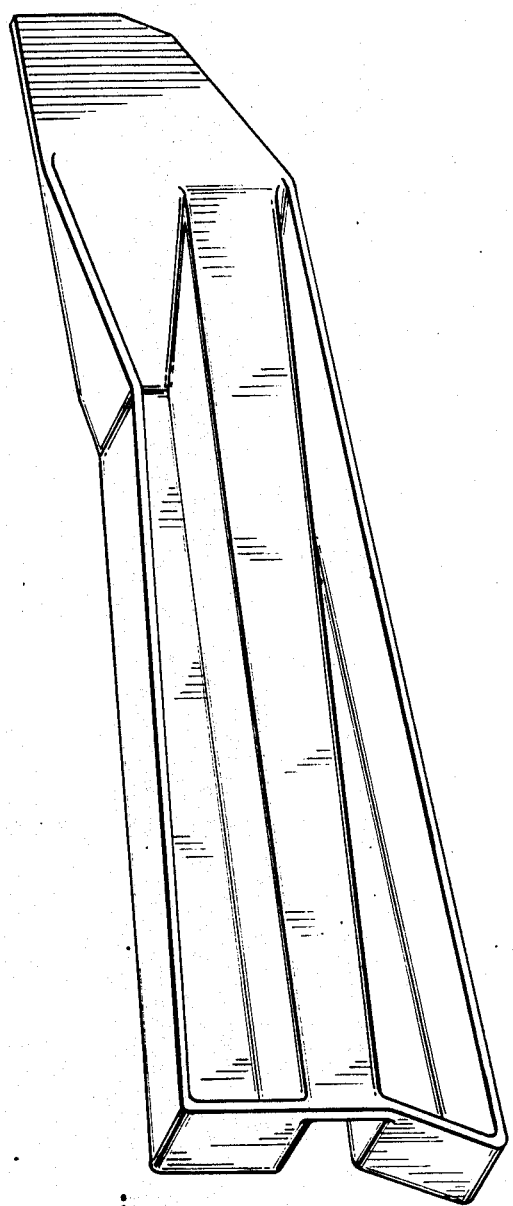
Figure 12:
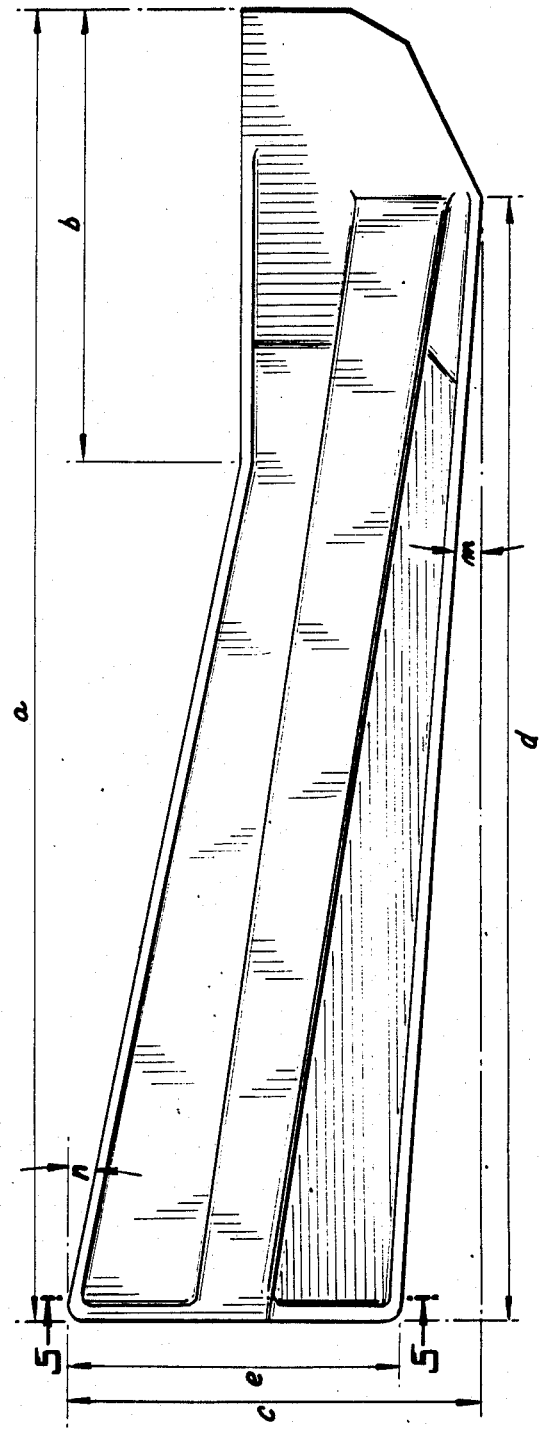

FIGS. 11 and 12 show an automobile bumper beam molded by the process of this invention.

Figure 1:
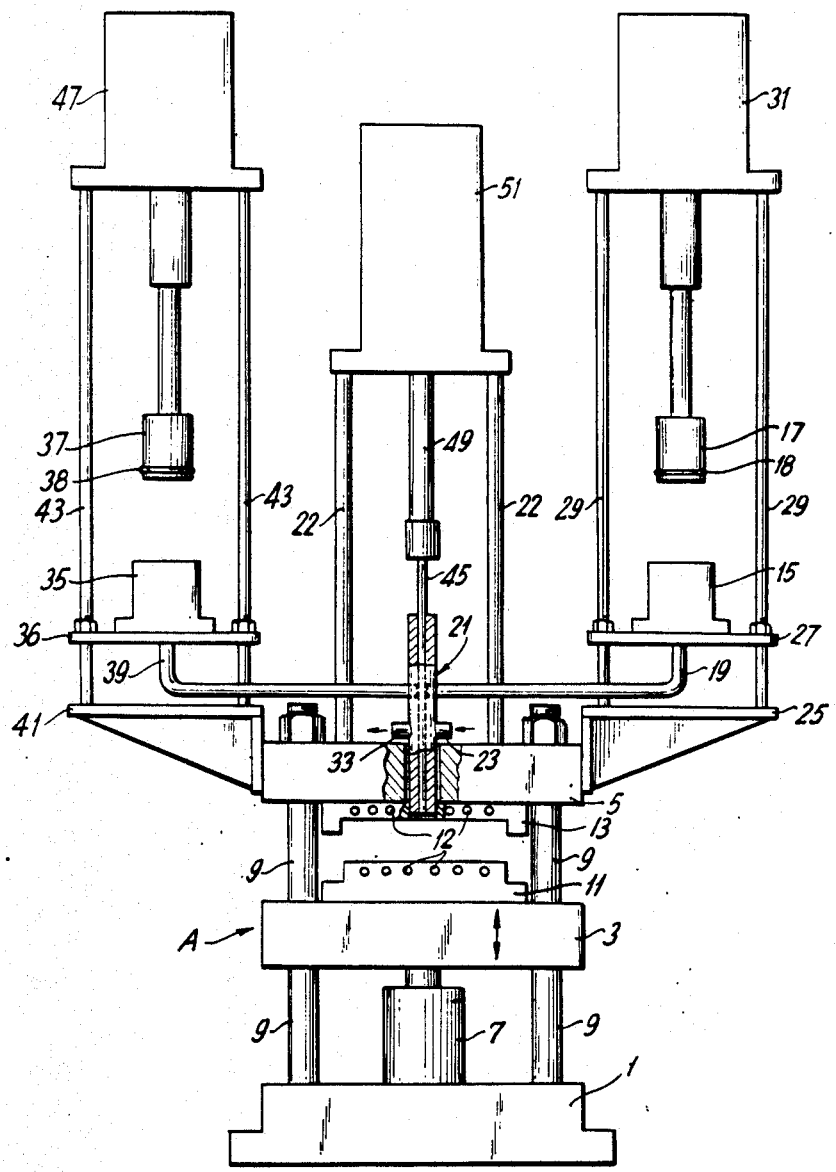
FIG. 1 is an elevated view with partial cross-sections of a molding apparatus containing accumulators, and a mold for effecting the process of this invention.

FIG. 1, depicts a side view of a platen press A. The press comprises a base 1 upon which the remainder of the structure of the apparatus is positioned. The press comprises platens 3 and 5 having the capacity of being closed to one another by a hydraulic cylinder 7 which moves platen 3 into closure position relative to platen 5. Platen 5 is a fixed platen. Between platens 3 and 5 are female die 13 and male die 11. Each of die 13 and 11 contain a plurality of electric cartridge heaters 12 which heat the mold when the dies are closed. Columns 9 (four are affixed on base 1) support platen 5 and guide the path of moveable platen 3. Situated in a hole disposed centrally of fixed platen 5 is injection nozzle 21 which is provided with a water cooled jacket. Port 23 provides for water inlet and port 33 for water removal in cooling injection nozzle 21. Positioned within the center of nozzle 21 is closure rod 45. Closure rod 45 is affixed to cylinder rod 49 which is controlled by raising and lowering hydraulic cylinder 51. Post 22, suspended above platen 5 supports cylinder 51. In the practice of this invention, the apparatus can be provided with a plurality of nozzles positioned about the mold to uniformally distribute resinous materials to the mold.

Resinous or other materials, as described previously, are supplied to injection nozzle 21 through pipes 19 or 39, from accumulators 15 and 35, respectively. Additional accumulators may be provided in the apparatus to provide other materials which can be injected into the mold in the manner depicted in FIG. 1. Accumulators 15 and 35 are open cups into which the resinous material is supplied. In another embodiment of the invention, a continuous feed may be supplied to accumulators 15 and 35 from sources outside of the accumulator, such as a mixing tank which contains a feed pump or a compression pump. Located above accumulators 15 and 35, are pistons 17 and 37, driven by hydraulic cylinders 31 and 47, respectively. The pistons shown in FIG. 1 are in an open position from the accumulators so that resinous materials or any other additional materials can be poured into the accumulator cups. The open position is not necessarily an appropriate position for the pistons, if the accumulator is supplied with material from its side and from a source outside of the accumulator. In such an embodiment, the pistons would be positioned within the upper surface of the accumulator to act as a seal for the materials contained within the accumulator and for more rapid closure of the accumulator in applying pressure for injecting materials into the mold. Pistons 17 and 37 contain 0-rings 18 and 38, respectively, which seal the space between the outer surface of the pistons and the interior surface of the accumulators, to prevent resinous or other materials contained in the accumulators from entering the space between the respective walls. Accumulator 15 sets upon support plate 27 which is supported by posts 29 which supports cylinder 31. Accumulator 35 sits upon plate 36 which is held in position by posts 43 which support cylinder 47. The accumulator assembly posts 29 and 43 rest upon platform 25 and 41, respectively.

In FIG. 1, nozzle 21 as shown, extends into and through the fixed press platen 5. Nozzle 21 is cooled in order to prevent premature thermosetting of the resinous material before injection into the mold. Care must be taken so that the cooling does not adversely affect the molding operation and the temperature of the resinous composition within the mold. Thus, a careful balance must be considered in the design of the injection nozzle so that the cooling is effective for the purposes of preventing premature reaction and thermosetting of the resinous composition, but at the same time does not adversly affect the actual molding operation.

Without any post addition of any additives, the apparatus depicted in FIG. 1 is operated as follows: Resinous material is transferred into accumulator cup 15 to provide a charge which is suitable to fill the mold cavity. Water flows in the interior of the jacket surrounding injection nozzle 21 through ports 23 and 33. Heaters 12 in the mold are activated to provide a temperature of, for example, 110° C. A web of fibrous material is supplied to the top of the male die within the framework of the mold. The web is cut to the dimension of the die so that when the mold is closed, essentially all of the cavity contains the required amount of fibrous web. The resinous material contained in accumulator 15 is, for example, a bis(maleate) or bis(acrylate) of a polyol and a monoethylenically unsaturated monomer, such as styrene, in combination with a peroxide curing agent. The mold is then closed to receive resinous material. The resinous mixture is transported by lowering piston 17 into accumulator 15 with pressure, which drives the resinous material from accumulator 15 through pipe 19 into injection nozzle 21. The passageway of the resinous material from pipe 19 to the mold is blocked by the presence of closure rod 45. Rod 45 extends below the point at which pipe 19 supplies resinous materials to the injection nozzle. When rod 45 is raised above that point of injection of the resinous material to the injection nozzle, the resinous material flows into the mold. Closure rod 45 is a very simple and elegant device for controlling the flow into and out of the nozzle.

The resinous material is then passed from the nozzle into the mold under a pressure sufficient to transport it to the extremities of the mold. The pressure required to transport the material depends upon a wide variety of factors such as, mold design; size of the mold; complexity of the configuration of the mold cavity; density of the fibrous web within the mold; viscosity of the resinous material supplied to the mold; temperature of the mold; rate of reactivity of the resinous material, particularly its rate of advancement and polymerization during the course of injection; backpressure within the mold (since the mold contains no vent to release air from the mold); number of injection nozzles into the mold (the more nozzles in the mold the less pressure is required to fill the mold); the surface tension that exists between the fibrous web and the advancing resinous material supplied to the mold, and the like considerations.

After the full charge in the accumulator is supplied to the mold, the mold is opened after the resinous material therein is in a thermoset condition.

At times, it is desirable to supply a coating over the molded article in order to improve its surface appearance, as previously described. Accordingly, after the composition has been formed within the mold and has undergone shrinking, further resinous material can be injected into the mold. This is accomplished by maintaining piston 17 in constant contact with the liquid resinous material present in accumulator cup 15. The required amount of resinous material which will be supplied to the mold is determined by the concentration of the resinous material which the mold can accept in combination with the back pressure which builds up and precludes the downward passage of piston 17. However, once rod 45 lifts, after molding of the initial thermoset resinous article, additional resin will be able to flow through pipe 19 through injection nozzle 21 and into the mold, since the mold now has enough space to accommodate such flow. As a result, piston 17, in a constant position on top of the surface of the liquid, will act to supply additional pressure and force the liquid to pass across the extremities of the remaining space in the interior of the mold. Once the back pressure builds up, indicating completion of the filling of the mold, then rod 45 can be placed into a closing position relative to pipe 19 which will automatically repel a downward motion of piston 17. However, if shrinking of the thermoset article in the mold is not adequate to supply a uniform coating across the surface, then the mold should be opened sufficiently to provide an adequate and relatively uniform space so that the entire surface of the article can be covered by a subsequent addition of resinous material. A coating material such as a polyurethane, can be supplied from accumulator 35 into the mold cavity and about the surface of the article by repeating the same procedure with respect to accumulator 15. In this procedure, platen 3 is moved a small distance downwardly from the mating relationship which exists between dies 11 and 13. This distance ranges from 0.1 millimeter to about 3 millimeters. Spacers are inserted as stops between the two dies at their contacting surfaces so that when platen 3 is raised in contacting relationship to form the cavity, the stops provide the desired space.

After molding is complete, the mold is open and the product is withdrawn. In some instances, due to mold design, it is necessary to mechanically finish the molded article. Proper design of the mold should minimize any mechanical treatment such as sanding, grinding, etc. that might be needed to provide a finished molded product.

FIG. 2, describes a simple sleeve arrangement that is utilized in conjunction with the injection nozzle described in FIG. 3 to provide a jacketing about the nozzle so as to maintain the temperature within the nozzle below the temperature which initiates curing of the resinous material therein. FIG. 2A shows a side view of a metal cylindrical sleeve 100 possessing outer surface 101 and interior cylindrical surface 102. The sleeve contains two openings 23 and 33. At one end is opening 105, and at the other end is opening 103, which contains therein threaded section 104. Also, FIG. 2B shows an end view, A', of sleeve 100. FIG. 2C depicts a sectional view along line 2C—2C, indicating the relationship of the openings in the cylinder relative to one another.

FIG. 3A describes resin injection nozzle 150 which contains cylindrical opening 151 centrally disposed. Resin supplied to nozzle 150 is introduced through opening 165, supplied with threading for a tight fit with pipe 19. At one end of nozzle 150 is an opening in which threaded section 161 is located, and which is designed to be connected to an oppositely threaded packing bushing, not shown, through which rod 45 is passed. The bushing serves to prevent resin from moving upward and out of the injection nozzle. It should be obvious that the threaded end of the nozzle, when employed in an apparatus assembly as set forth in FIG. 1, would be the upper and vertical most part of the injection nozzle. Thus, as resin is introduced through port 165 into cylindrical opening 151, the material moves to the left and out of the left most opening of nozzle 150. At that point the resin enters the cavity of the mold. Threaded portion 159 serves the function of engaging the nozzle to a flange portion which is rigidly connected to platen 5 and thereby serves to locate and position the injection nozzle 150 within the framework of the mold assembly. A threaded portion 157, however, holds and firmly engages sleeve 100 about the lower extremities of the injection nozzle. Thus, threads 104 are engaged with threads 157 in order to secure sleeve 100 about the body of nozzle 150 between slot openings 153 and 152. Slot openings 152 and 153 are shown in section view 3C—3C (See view C'', FIG. 3C) and 3E—3E (See view E'', FIG. 3E). Located below and above slot openings 152 and 153 is groove 163 which is of the same dimension and contains O-rings which serve as a seal to prevent water flow out of the sleeve and out of the injection unit assembly. The rings are in direct contact with interior surface 102 of sleeve 100. One end of the nozzle 170 is tapered to an angle of about 45°. Thus, exterior surface 101 circumscribes that portion of the resin injection nozzle which extends between slots 163 at the lower extremity of the nozzle and threaded portion 157 in the upper portion of the nozzle. Water is injectable in opening 23 of sleeve 100 into one of the slots 155, 155a, 155b or 155c as shown in cross-section 3D—3D (See the cross-sectional illustration "D", in FIG. 3D). Thereafter, the water flows down the slot across to groove 152 up to another of the slots 155 across the slotted groove 153 down another of the slotted grooves eventually back up to 152 and finally back up to a remainder of groove 155 to exit port 33 of sleeve 100 and is recovered through another tubing so that it is removed from the injection assembly. The extremities of the slot can be better seen in FIG. 3B which is a cross-sectional view along line 3B—3B (See the end view of FIG. 3F).

FIG. 4, shows a partial perspective view of fiber cutting equipment assembled in conjunction with a spray gun assembly to spray a combination of thermoplastic or thermosettable resinous binder material with staple fibers to form a random web. The equipment assembly shown in FIG. 4 comprises a conventional spray gun 200, such as De Vilbiss Model JGA-502 spray gun which has welded on top of it, a conventional glass fiber chopper 203, such as a Bink's Renegade Chopper, made by Binks Manufacturing Company, Chicago, Ill., in particular Assembly No. 101-8,000. The spray gun depicted in the drawing can have a De Vilbiss pressure pot such as, Model KB-519 with a De Vilbiss tip, Model AV-601 - EX containing a nozzle needle Model JGA-402 DEX. In FIG. 4, the pressure pot is 201 and contains therein binder solution 208. The gun is fed with air through line 211.

A spray gun platform 210 is welded to the top of the spray gun. Cutter 203 is bolted onto the platform 210. Compressed air is fed to the gun through tubing 211. The relative position of tubings 209 and 211 are held fixed for the convenience of the operator by sleeves 215 and 213, which are held together by rod 217 which is welded to each sleeve. The Renegade Chopper comprises a cylindrical cutter having a plurality of blades about a cylindrical steel plug. Blades are spaced apart on the cylinder at a distance which is equal to the desired length of fiber. The rotating cylindrical plug contained in the blade is mated against a rotating cylindrical rubber plug so that the fiber is cut as it passes between the two rotating plugs. The blade rotates the next blade within the plug and engages a fiber at a point down stream and as the fiber is brought forward to the point where the two plugs contact, it is cut again. In this manner, continuous fibrous filaments are cut into staple sizes ranging from 1 inch to 2 inches, or more. Compressed air is fed into chopper 203 through line 209 and cut fibers are blown out of chopper 203 as a spray or are blown into an area which intersects the spray path being emitted from the spray gun 200. Continuous fiber 204, introduced into chopper 203, is cut and caught up in the air stream from tubing 209 to produce a stream of cut fibers 205 which intersects spray 206 being emitted from spray gun 200 forming a composite stream of binder and fiber as well as a coated fiber forming a composite stream 207. Composite stream 207 can be directed to one or both of the dies of the mold. Typically, a mask which circumscribes the molding area is placed in the mold and the spray 207 is directed to the male surface of the mold to cover it in the desired predetermined pattern, typically a uniform pattern across the mold surface. If extra strength is required in the molded article, additional reinforcing fibers can be placed preferentially where extra strength is needed.

The operation as described, can be automated by utilizing mechanical means, such as robots, or other devices, for automating the combination of a chopper and a sprayer to produce a web. Techniques which have been previously utilized in the formation of preforms, such as in the manufacture of fiberglass reinforced plastic, can also be employed. This feature of the invention will typically utilize standard equipment readily available in the art.

A technique which can greatly automate the procedure is to make a separate form away from the mold which replicates the male die. This form produces a shape of a web from the combination of binder and fibers emitted from a chopper and spray gun combination. After the web is formed and dried, it can be lifted from the form and introduced into the mold. In addition, a form or a multiplicity of replicating forms can be used in which any number of web sections can be made as a single unit across the total face of this enlarged collection of forms. One form may then be cut out of it for the molding operation. In this manner, the web can be made in a relatively mass production type of procedure in order to maintain a ready supply of such forms for a plurality of molds and thereby greatly enhance the speed at which the molding operation is carried out.

FIG. 5 describes the male die of a matched metal die mold. FIG. 6 depicts the female die of a matched metal die mold.

The male die 300 of FIGS. 5A and 5B has a raised surface 302. This surface is typically the desired surface upon which the web is placed or is produced. In the foregoing discussion concerning spraying fibers in combination with binder on top of the die, a mask would be employed which would reveal only the part of the mold which constitutes the molding cavity. When the mask is removed, the remainder of the mold is clean and thereby interconnected surfaces would not be adversely hindered in achieving closure of the mold. As shown in FIG. 5B, electric cartridge heaters 304 are located through the mold. The mold as shown in FIG. 5, is 10 inches by 11 inches and the electric heaters are 8 inches long. A typical electric cartridge heater for such a mold would be 700 watts, 240 volts and have a $\frac{3}{8}$ inch diameter.

With reference to FIGS. 6A and 6B, the female die contains the same type of electric heaters 311, as the male die, extending through the mold. The outer dimensions of the mold are the same as those of the male die shown in FIG. 5. The mold contains one additional electric heater. The cross-sectional view along line 6B—6B of FIG. 6A shows an injection port 313. The injection nozzle is fitted into opening 314 which contains an O-ring 315 which forms a seal with the tip of the nozzle 170 in FIGS. 3A and 3B. Opening 313 has essentially the same interior diameter as the interior diameter opening 151 of nozzle 150. The female cavity 309 is of appropriate dimension and configuration to accept the surface 302 of the male die. Although not shown, resin may be injected along the edge of the part in a technique known as edge gating.

FIG. 7 schematically illustrates the components, as they are interrelated in the molding system and molding process of this invention. Fiberglas roving is supplied to the chopper where it is cut and combined with binder from the "preform binder" source and supplied to a preformer which typically has the shape of the interior of the mold. The preform web is supplied to the mold for the purpose of making the molded part. The resinous material, with catalyst and other additives, is supplied to a resin premixing section and thereafter fed into the injection system. The injection system encompasses the accumulator and injection nozzle. The resinous material is supplied to the mold after it is closed. After the cure cycle is achieved, the molded part is removed from the mold.

FIG. 8 depicts a system for the manufacture of preform webs. Fiberglass, as roving with perform binder, is supplied to a programmed chopper/sprayer system to supply the fiberglass and binder to a preform assembly system characterized as "preformer" in the Figure. The preformer is thereafter supplied to a preform compaction position which takes the bulky web, and compacts it to a dimension which is essentially equal to the interior cavity dimension of the mold. Compaction is achieved at moderate temperatures, such as those sufficient to hold the reinforcement in a compressed state. The web can then be used to form molded articles.

FIG. 9 describes an automated system for supplying the resin system to the injection assembly. In this depiction, resin, catalyst, and additives are controlled by a separate valve arrangement for supply to a resin premix kettle where they are thoroughly mixed. It is contemplated that the resin premix will have a temperature control system to preclude any chance of initiation of reaction of the resinous materials therein. For example, cooling coils can be supplied about or within the resin premix system. The resinous material is then supplied to the injection assembly for introduction into the mold. The resin injection system is controlled by a hydraulic cylinder and an overall hydraulic system to insure adequate control of the metering of the resinous materials into the mold.

FIGS. 10 shows an automated molding system. In a typical molding cycle for producing a molded part, the male half of the mold, 410, is placed in a predetermined position adjacent to robot 480. The end of the robot contains a fiberglass chopper, 470, and a binder spray gun 475 of the type characterized in FIG. 4. The fiberglass chopper 470 draws fiberglass from spool 460 and spray gun 475 is fed binder for the fiberglass from vessel 465. The robot 480 is programmed to spray the mold 410 with fiberglass and binder in a predetermined pattern. The program is stored in a floppy disc in computer control cabinet 482. A hydraulic pump unit 481 supplies the pressure to move the robot to its programmed positions. The robot can be programmed by two techniques, i.e., point to point or continuous path. In the point to point programming technique, the robot is taught specific points with set time intervals between these points. The distance between these points is typically one to four inches. This distance determines the rate of travel of the robot. When the points are close the robot moves slowly and when the points are more distant the robot's speed increases. The robot calculates 80 intermediate points between every programed point which insures smooth motion between each point and throughout the entire program. When the robot is physically positioned at the programmed points, the points are automatically recorded on a disc in a computer. The program can then be continually replayed. Each programmed point represents an "on" or "off" position for the binder and fiberglass spray.

In the continuous path programming technique, the robot records points at the rate of up to 80 per second depending on the setting and records continuously all points during the teaching path. This technique requires more storage space on the disc of the computer. Also, since the robot must be moved quickly, accuracy is not nearly as great as with the point to point programming technique wherein the time factor is not part of the program.

One of many programs can be chosen to permit the robot to spray the fiberglass and binder in predetermined patterns. Such programming techniques are well known in the art and form no part of this invention.

When the robot has completed spraying its pattern onto the mold surface, it moves to a position away from the mold. Compactor 450 is brought into position about the male mold assembly by hydraulic cylinder 454. Compactor bars 451, each of which contain heaters 452, are positioned to circumscribe the mold and are actuated by hydraulic cylinder 453 to move toward the mold and compress the fiberglass against the mold's sidewall surface. After approximately 30 seconds, compactor bars 451 are removed from the mold by hydraulic cylinder 453. Hydraulic cylinder 454 then raises compactor 450 to a position remote from the mold. The mold is then moved on a track by the mold traverse chain belt mechanism, 440 which is driven by motor 441, to the hydraulic press 400. When the hydraulic press 400 is closed, the male mold 410 comes in contact with female mold 411. When the mold is closed, injection nozzle rod 421 of injection nozzle assembly 420 is retracted from the nozzle 422, said nozzle being positioned in the female half of the mold 411. Resin which is in accumulator 430 is forced by piston 431 through conduit 425 and through nozzle 422 into the mold cavity formed by mold halves 410 and 411. The time to fill the mold is about 10 seconds. Nozzle rod 421 is left open for about an additional 30 seconds before it is closed. This constitutes the dwell time. This also insures removal of all the air surrounding the fiberglass located in the mold cavity. After rod 421 closes, the mold is kept closed for about an additional two minutes to cure the resin. The hydraulic press then opens and a molded part is removed. The male mold 410 is then returned by mold traverse mechanism 440 to the spraying location. The cycle is then ready to be repeated.

FIG. 11 shows a perspective view of an automobile bumper support beam which can be molded by the process of this invention.

FIG. 12 shows a side elevation of the beam wherein a is about 23 ½ inches, b is about 8 inches, c is about 7 ½ inches, d is about 20 inches, e is about 6 inches, m is about 4 degrees, and n is about 13 degrees.

EXAMPLES

The following examples serve to give specific illustration of the practice of this invention but they are not intended in any way to act to limit the scope of this invention.

EXAMPLE 1

The equipment shown in FIG. 4 was used to make a web of random chopped fiberglass. The fiberglass was one inch long and was held together in the web with polyvinyl acetate binder. Air at 80 psi was supplied to the chopper and the chopper velocity control knob was opened ¼ turn. The glass strand tension knob was set so that the knurled locking plate was 2 ¾ turns beyond the thumb knob. Air to the blower portion of the chopper was set on off. The spray gun was set so that the air pressure to the unit was 24 psi when there was no air flow. During operation of the spray unit, the air pressure dropped to 15 psi. The air pressure to the liquid pot on the gun was regulated to 10 psi at a zero flow condition. The fan control knob was fully opened and the liquid control knob was open ⅝ of a turn. The chopper and sprayer were operated simultaneously for 3 minutes and a 3×3 foot layer of chopped fiberglass and binder was formed. The binder was an emulsion of equal weights of polyvinyl acetate and water. The binder was made by diluting UCAR® 131 (a polyvinyl acetate emulsion made by Union Carbide Corporation, New York, N.Y. which is 60% solids) with water. The layer of glass and binder had a free thickness of about 1 ½ inches. The weight of the fiberglass was 2709 grams and the weight of the polyvinyl acetate binder was 223 grams.

EXAMPLE 2

The sprayed web prepared as in Example 1 was compressed to a thickness of about ¼ inch by placing it between heated metal plates of a pressing device for 30 seconds at 71° C. The fluffly web was reduced in thickness to the distance between the heated plates, i.e., ⅛ inch. When the web was removed from the pressing device, the thickness remained essentially unchanged.

EXAMPLE 3

The apparatus shown in FIG. 1 was used to mold flat plaques measuring 6¼×6¼×⅛ inches. Dow Derakane 411-C-50 (a thermosetting vinyl ester resin composition containing a mixture of epoxy resins capped with methacrylic acid and 50 percent styrene and manufactured by Dow Chemical Co.) having a viscosity of about 140 centipoise at room temperature (23° C.) was used. Four hundred grams of this resin was mixed with 4 grams of tertiary butyl perbenzoate catalyst and 2 grams of Zelec UN mold release agent (An organophosphate mold release sold by E. I. DuPont de Nemours, Wilmington, Del.). Part of the mixture was charged to pot 15 of FIG. 1. Mold halves 11 and 13 were heated to 130° C. Eighty-six grams of fiberglass web prepared as in Example 1 were placed in the male portion 11 of the mold, and the mold was closed. (The mold halves were not perfectly matched so that air and some resin was able to escape during the injection cycle). The pressure on cylinder 31 was set at 25 psi, rod 45 was retracted by cylinder 51, and the resin composition was injected into the heated mold. The diameter of the piston in cylinder 31 is 5 inches and the diameter of piston 17 is 2 inches. This means the pressure in the mold is 6.25 times greater than the pressure in cylinder 1. It took 25 seconds to inject the resin into the mold. After 5 minutes, a cured plaque was removed from the mold. The molded part contained about 62 percent by weight fiberglass and had a flexural strength and modulus (as measured by ASTM D-790) of 48,200 psi and 1,750,000 psi, respectively.

EXAMPLE 4

The apparatus of FIG. 1 was used in combination with the male and female molds shown in FIGS. 5 and 6 respectively, to mold a hood scoop with the following dimensions: 7½ inches long, 6 3/16 inches wide and 1¼ inches high. A thermosetting polyester resin composition, Gr 13031 was used to mold this part. (GR 13031 polyester resin composition contains a cross-linkable polyester oligomer prepared from maleic anhydride, phthalic anhydride and propylene glycol. This composition contains 40 percent styrene monomer and has as Brookfield viscosity at 25° C. of 550 centipoise and is made by U.S. Steel Corp.) One percent by weight of methyl ethyl ketone peroxide catalyst and 0.2 weight percent Zelec UN mold release were added to the resin.

A fiberglass web prepared as in Example 1, measuring 5×7 inches and weighing 68 grams was placed in the mold and the mold was closed. The mold was heated to 115° C. The apparatus was operated as described in Example 3. The resin was injected into the mold in 11 seconds. The injection pressure was 15 psi. After 3 minutes, the cured part was removed from the mold. The molded part weighed 109.5 grams and contained 62 percent by weight fiberglass. It had a flexural strength and modulus of 11,900 psi and 940,000 psi, respectively.

EXAMPLE 5

The procedure of Example 4 was exactly repeated except that polyester resin, GR 14017, was used to mold the hood scoop. (GR 14017 is a thermosetting polyester resin composition of a polyester oligomer derived from maleic anhydride and an iso/terephthalic mixture, diethylene glycol and propylene glycol and contains 30 percent styrene monomer. It has a Brookfield viscosity at 25° C. of 2500 centiposies and is manufactured by U.S. Steel Corp.) The resin had a viscosity of less than 50 centipoise when heated to 120° C. One percent by weight of methyl ethyl ketone peroxide catalyst and 0.2 weight percent Zelec UN mold release were added to the resin.

A fiberglass web, prepared as in Examples 1 and 2, and weighing 70 grams, was cut to the shape of the mold and placed in the mold. The mold was heated to 115° C. The apparatus was operated as described in Example 3. The resin was injected into the mold in 4 seconds. The injection pressure was 25 psi. After 2 minutes, the cured part weighing 143 grams and containing 49 percent fiberglass was removed from the mold. The molded part was rigid and had a good surface appearance.

EXAMPLE 6

The procedure of Example 5 was exactly repeated except that fiberglass was sprayed directly onto the male mold surface shown in FIG. 5. The equipment shown in FIG. 4 was operated as described in Example 1 to apply about 60 grams of fiberglass and binder onto the mold in 4 seconds. The mold was heated to 115° C. The apparatus was operated as described in Example 3. The injection pressure was 10 psi initially and then raised to 25 psi after 10 seconds. After 2 minutes, the cured part was removed form the mold. The molded part was rigid and had a good surface appearance.

EXAMPLE 7

The apparatus of FIG. 1 was used to mold hood scoops 7½ inches long, 6 3/16 inches wide and 1¼ inches high, using the male and female molds shown in FIGS. 5 and 6.

A resin composition of maleic anhydride capped 2,2-dimethyl-3-hydroxypropyl 2,2-dimethyl-3-hydroxypropionate (prepared according to the procedures set forth in U.S. patent application, Ser. No. 034,996, supra), 45 percent by weight of styrene, 150 parts per million of hydroquinone, 1 percent by weight tertiary butyl perbenzoate, and 0.3 percent Zelec UN mold release was used. This composition had a viscosity of about 50 centipoise at room temperature (23° C.).

A fiberglass web prepared as in Example 1, measuring 5×7 inches, and weighing 71 grams, was placed in the mold. A 0.015 inch thick gasket was placed around the edge of the mold cavity to eliminate leakage of the low viscosity resin composition. The mold was heated to 130° C. The apparatus was operated by the procedure set forth in Example 3. The resin was injected into the mold in 10 seconds. The injection pressure was 5 psi initially and was increased to 25 psi during injection. After 2 minutes, the cured part was removed from the mold. The molded part weighed 116 grams and contained 56 percent by weight of fiberglass. It had a flexural strength of 45,600 psi and a flexural modulus of 1,840,000 psi.

EXAMPLE 8

The procedure of Example 7 was repeated except that the resin composition contained ethoxylated bisphenol-A dimethacrylate and 60 percent by weight of styrene (prepared according to the procedure set forth in U.S. patent application, Ser. No. 035,012, supra), 1 percent by weight of methyl ethyl ketone peroxide and 0.3 percent by weight of Zelec UN mold release. A fiberglass web prepared as in Example 1, measuring 5×7 inches, and weighing 67 grams, was placed in the mold. A 0.015 inch gasket was placed around the edge of the mold cavity. The mold was heated to 125° C. The apparatus was operated by the procedure set forth in Example 3. The resin was injected into the mold in 2 seconds. The injection pressure was 20 psi. After 10 minutes, the cured part weighing 115 grams was removed from the mold. The molded part had a flexural strength of 25,700 psi and a flexural modulus of 1,315,000 psi.

EXAMPLE 9

The procedure of Example 7 was exactly repeated except that the resin composition contained a diacrylate of 2,2-dimethyl-3-hydroxypropyl 2,2-dimethyl-3-hydroxypropionate (prepared according to the procedure set forth in U.S. patent application, Ser. No. 035,012, supra), 45 percent styrene, 1 percent tertiary butyl perbenzoate, and 0.3 percent Zelec UN mold release. A fiberglass web was prepared as in Example 1, measuring 5×7 inches, and weighing 72 grams, was placed in the mold. A 0.015 inch thick gasket was placed around the edge of the mold cavity. The mold was heated to 130° C. The apparatus was operated by the procedure set forth in Example 3. The resin was injected into the mold in 15 seconds. The injection pressure was 5 psi initially and increased to 25 psi during injection. After 8 minutes, the cured part was removed from the mold. The molded part weighed 120 grams and contained 50 percent by weight of fiberglass. It had a flexural strength of 37,700 psi and a flexural modulus of 1,640,000 psi.

EXAMPLE 10

The procedure of Example 7 was exactly repeated except that the resin composition contained the reaction product of maleic anhydride, phthalic anhydride and propylene glycol (prepared according to the procedure set forth in U.S. patent application, Ser. No. 035,997, supra), 45 percent styrene, 1 percent tertiary butyl perbenzoate and 0.3 percent Zelec UN mold release. A fiberglass web prepared as in Example 1, measuring 5×7 inches, and weighing 69 grams, was placed in the mold. A 0.015 inch thick gasket was placed around the edge of the mold cavity. The mold was heated to 130° C. The apparatus was operated by the procedure set forth in Example 3. The resin was injected into the mold in 10 seconds. The injection pressure was 5 psi initially and increased to 25 psi during injection. After 10 minutes, the cured part was removed from the mold. The molded part weighed 111 grams and contained 54 percent fiberglass by weight, and had a flexural strength of 35,900 psi and a flexural modulus of 1,600,000 psi.

EXAMPLE 11

The apparatus of FIG. 1 was used in combination with the male and female molds shown in FIGS. 5 and 6, respectively, to mold a hood scoop 7½ inches long, 6 3/16 inches wide, and 1¼ inches high. The polyester resin of Example 5 was used.

A fiberglass swirl mat, (OCF M 8641 2 ounce, 50 inch 91K 70820, Owens Corning Fiberglas) was used. Four pieces of this material were cut into a shape which fit the entire mold cavity. The total weight of the glass pieces was 76.5 grams. The mold was heated to 115° C. The apparatus was operated as described in Example 3. The resin was injected into the mold in 25 seconds. The injection pressure was 40 psi. After the resin had been in the mold for 40 seconds, the mold was opened and metal shims 0.008 inches thick were inserted along two sides of the mold. The mold was then closed. Another charge of resin was injected into the mold at a pressure of 50 psi. Three minutes after the second injection of resin, the cured part was removed from the mold. The gap generated by the shims that were placed between the mold halves provided a space in the mold for a thin layer of resin. This thin layer of resin provided a molded part whose surface replicated the mold surface and the pattern of glass was not noticeable on the molded part.

EXAMPLE 12

The apparatus of FIG. 1 was used to mold a hood scoop 7½ inches long, 6 3/16 inches wide and 1¼ inches high, using the male and female molds shown in FIGS. 5 and 6. A resin identical to that of Example 7 was used except that the styrene content of the resin was 50 percent and the Zelec UN mold release content of the resin was 2.4 percent.

A fiberglass web prepared as in Example 1 was cut to fit the mold. 77 grams of this fiberglass web were used. A 0.015 inch gasket was placed around the edge of the mold cavity. The mold was heated to 130° C. The apparatus was operated by the procedure set forth in Example 3. The injection pressure was 5 psi initially and was increased to 20 psi after 5 seconds. The injection pressure was held at 20 psi for 1 minute and then raised to 50 psi for an additional 2 minutes. The pressure was then reduced to 10 psi and held there for 7 minutes. The cured part was removed from the mold.

Polyester resins shrink as they cure. By injecting the second charge of resin at 50 psi, after the resin had been in the mold for 1 minute, the volume that had been generated by the resin shrinkage was filled with this second charge of resin. The advantage of this technique is that the mold did not have to be opened in the middle of the molding cycle.

The finished part had a surface that replicated the mold surface.

EXAMPLE 13

The apparatus of FIG. 4 was used to make a web from carbon fibers. The carbon fibers (graphite yarn) were Thornel 300 Grade WYP 15 1/0 Finish UC 314. (These carbon fibers are sold by Union Carbide Corporation, New York, New York.) The fiber chopper was set exactly as in Example 1. The spray gun was set exactly as in Example 1, except that the liquid control knob was open only 7/16 of a turn. The spray unit was operated for 125 seconds and 203 grams of carbon fibers and 25 grams of polyvinyl acetate binder were sprayed onto the mold surface to form a web. The web had a free thickness of about ⅜ inches and weighed 228 grams.

EXAMPLE 14

The apparatus of FIG. 1 was used in combination with the male and female molds shown in FIGS. 5 and 6 to mold a hood scoop 7½ inches long, 6 3/16 inches wide and 1¼ inches high. The fiberglass web produced in Example 1 and the carbon fiber web produced in Example 13 were cut to the shape of the mold. A layer of carbon web weighing 13 grams was placed in the mold and a layer of fiberglass web weighing 38 grams was placed on top of the carbon web. A third layer of carbon web weighing 14 grams was placed on top of the fiberglass web. A 0.015 inch thick gasket was placed around the edge of the mold cavity and the mold was closed. The mold was heated to 130° C. The apparatus was operated as described in Example 3. The resin described in Example 12 was injected into the mold. The injection pressure was 5 psi initially and was increased to 40 psi after 5 seconds and held at this pressure for 2 minutes. The pressure was then lowered to 5 psi. After 10 minutes, the cured part containing 41 percent fibers was removed from the mold. The molded part had a flexural strength of 36,700 psi and a flexural modulus of 2,410,000 psi.

EXAMPLE 15

The apparatus of FIG. 1 was used to mold a flat plaque 7×7×⅛ inches. A random web was made from aromatic polyamide fibers (I.P. Kevlar 49 paper series 610-49 0.8 oz/square yard, 1½ inch fibers supplied by International Paper Co, Tuxedo Park, N,Y.) The resin composition contained maleic anhydride capped 2,2-dimethyl-3-hydroxypropyl 2,2-dimethyl-3-hydroxypropionate (prepared according to the procedure set forth in U.S. patent application, Ser. No. 034,996, supra), 45 percent styrene, 68 parts per million benzoquinone, 0.5 percent of Zelec UN mold release and 0.1 percent of N-methylimidazole. 50.8 grams of the fibers were placed in the mold. A 0.015 inch thick gasket was placed around the mold cavity and the mold was closed. The mold was heated to 163° C. The resin was injected into the mold in about 30 seconds. The injection pressure was 70 psi. After 8 minutes, the cured part containing 45 weight percent fiber was removed from the mold. The molded part had a flexural strength of 13,000 psi and a flexural modulus of 895,000 psi.

EXAMPLE 16

The automated molding system shown in FIG. 10 was used to mold an automobile bumper support beam as shown in FIG. 11. The resin composition was a mixture of maleic anhydride capped 2,2,4-trimethyl-1,3-pentanediol and propylene glycol (prepared according to the procedure set forth in U.S. patent application, Ser. No. 034,995, supra, and wherein the mixture contains 60.9 mole percent of the 2,2,4-trimethyl-3,3-pentanediol and 39.1 mole percent of propylene glycol and the ratio of OH groups in the diol to maleic anhydride is 1:1), 50 weight percent of styrene, 0.5 percent of Zelec UN mold release, and 1.5 percent of tertiary butyl perbenzoate. The composition had a viscosity of about 50 centipoise (25° C.).

The accumulator 430 in FIG. 10 was filled with the resin composition. The accumulator holds enough resin to make 5 parts before refilling is required. The mold was heated with 70 psig steam to a temperature of 150° C. The male half of the mold was sprayed with one inch chopped fiberglass (OCF 447 BA 162 made by Owens Corning Fiberglas Co.) and a binder consisting of the bis methacrylate ester of a polyethylene glycol prepared by reacting polyethylene glyol having a molecular weight of 600 with 2 moles of methacrylic acid, and 1.5 parts per hundred tertiary butylperoctoate. The binder weight was about 5% of the chopped fiberglass. An industrial robot (DeVilbiss/Trallfa Tr-3003S) was used to deposit the binder and chopped fiberglass onto the male half of the mold. A Devilbiss AGB 549 automatic spray gun and a Binks renegade chopper Assembly No. 101-8,000 were the components on the head of the robot that sprayed the binder and chopped the fiberglass, respectively. The robot was programmed to spray 750 grams of fiberglass in a predetermined pattern onto the surface of the male half of the mold. A compactor heated to 400° F. compressed the fiberglass and binder against the mold for 30 seconds at a pressure of about 200 to 225 psi. The fiberglass was compressed by the compactor to essentially the thickness of the mold cavity i.e., 3/16 inch. The compactor was then retracted from the mold. The male half of the mold was then moved to the molding press by the mold transverse chain belt mechanism. The hydraulic press was closed bringing together the two halves of the mold. Once the hydraulic press was up to clamp pressure, i.e., 250 tons, the injection nozzle was opened and the resin was injected into the cavity by the accumulator. The time required to fill the cavity was 11 seconds. The pressure during injection was about 200 psi and it increased to about 1000 psi when the entire cavity was filled with resin. An O-ring around the perimeter of the mold cavity prevented resin from leaking from the mold. The pressure of 1000 psi was maintained for 30 seconds with the nozzle open and then the nozzle was closed. The press remained closed for an additional 2 minutes to cure the resin. When the press was opened, a cured part weighing 1229 grams was removed. The part contained 60 percent by weight of fiberglass.

EXAMPLE 17

The procedure of Example 16 was exactly repeated. The molded part produced weighed 1232 grams.

EXAMPLE 18

The procedure of Example 16 was exactly repeated. The molded part produced weighed 1232 grams.

Examples 16 to 18 demonstrate that the instant process produces articles which are essentially replicated in that the molded parts weighed 1229, 1230 and 1232 grams, respectively.

EXAMPLE 19

The procedure of Example 16 was exactly repeated except that the nozzle remained open for 60 seconds after the mold cavity was filled with resin. The additional time the nozzle remained open allowed additional resin to fill the void created by resin skrinkage of the initial resin charge.

The molded part produced weighed 1274 grams.

The additional resin which was added to the mold produced a part which had a smooth, glossy surface.

What is claimed is:

1. A process for rapidly fabricating fiber reinforced thermoset resin articles in which the fiber reinforcement comprises one or more fibers with a melting point or a glass transition temperature above about 130° C., which process comprises the steps of:
   (a) providing one or more of such fibers in the form of an interlocked mass in a heated matched metal die mold in an amount such that from about 15 to about 80 weight percent of the fabricated fiber reinforced thermoset resin article is comprised of such fibers;
   (b) providing in an accumulator zone a liquid body of a thermosettable organic material having a viscosity determined at 120° C., in the absence of curing agents therefor, of less than about 50 centipoise, and which is curable within three minutes upon heating to a thermoset resin composition, the viscosity of said liquid body being maintained essentially constant in the accumulator zone by keeping its temperature below that at which curing of said material is substantial;

(c) closing the mold containing the interlocked mass of fibers;

(d) continuously injecting at least a portion of said thermosettable organic material under a substantially constant pressure of from about 2 to about 200 atmospheres from said accumulator zone into the closed mold to thereby fill the cavity in said mold;

(e) curing said thermosettable organic material at such a temperature in said mold that said thermosettable organic material cures within about 3 minutes after being injected into the mold; and then (f) opening said mold and removing the cured thermoset molded article therefrom.

2. The process of claim 1, wherein the fibers have lengths of from about 1 to about 2 or more inches.

3. The process of claim 1, wherein the fiber is a continuous filament.

4. The process of claim 1, wherein an amount of fiber is used such that the interlocked mass of fibers comprises from about 35 to about 80 weight percent of the molded article.

5. The process of claim 1, wherein the thermosettable organic material comprises a backbone component selected from an unsaturated polyester, an epoxy, or a vinyl ester.

6. The process of claim 1, wherein the thermosettable organic material comprises a curable composition of (a) a half ester of an organic polyol, (b) maleic anhydride, and (c) an ethylenically unsaturated monomer which forms a liquid homogeneous mixture and is copolymerizable with (a) and (b).

7. The process of claim 1, wherein the thermosettable organic material comprises a curable composition of a poly(acrylate), an ethylenically unsaturated monomer and an elevated temperature free-radical curing catalyst capable of effecting the co-reaction of the poly(acrylate) and monomer.

8. The process of claim 1, wherein the thermosettable organic material comprises a curable composition of a maleic anhydride capped polyester, and an ethylenically unsaturated monomer.

9. The process of claim 1, wherein the thermosettable organic material has a viscosity of from about 5 to less than about 200 centipoise at 23° C.

10. The process of claim 1, wherein the mold temperature exceeds the initiation temperature of the thermosettable organic material by at least about 10 to about 20° C.

11. The process of claim 1, wherein air is evacuated from the mold cavity prior to step (d).

12. The process of claim 1, including curing the resin in less than about 2 minutes.

13. The process of claim 1, wherein after step (e) and prior to step (f), feeding additional material into the mold.

14. The process of claim 13, wherein the additional material is fed to the mold after enlarging the mold cavity to receive the additional material.

15. The process of claim 1, in which the pressure employed to inject the material into the mold according to step (d) is greater than the pressure required to fill the cavity of the mold with said material.

16. The process of claim 1, including maintaining the pressure of injecting the thermosettable material beyond the time required to initially fill the mold cavity and adding additional resin in order to fill the void created by the shrinkage of the initial resin charge.

17. The process of claim 1, wherein the fiber reinforcement is fiberglass, carbon fibers or aromatic polyamide fibers.

18. The process of claim 17, wherein the fibers have a length of at least ¼ inch.

19. The process of claim 1, wherein a second accumulator zone is provided which contains therein a thermosettable composition different from said thermosettable organic material, and after step (e) and prior to step (f), at least a portion of said different composition is fed to the mold.

20. The process of claim 19, including filling said composition from the second accumulator zone to the mold after enlarging the mold cavity to receive said composition.

21. The process of claim 1, including spraying a combination of fiber and binder simultaneously onto the mold surface.

22. The process of claim 21, including compressing the bonded fiber on the mold surface.

23. The process of claim 21, wherein the bonded fiber is dried prior to injecting the organic material.

24. The process of claim 1, including forming the interlocked mass of fibers on the mold surface.

25. The process of claim 24, including forming regions of different density of the interlocked mass of fibers on the mold surface according to a predetermined pattern and amount.

26. The process of claim 1, including compressing the interlocked mass of fibers on the mold surface prior to step (c).

27. The process of claim 1, including forming the interlocked mass of fibers outside the mold and placing the mass of fibers in the mold in step (a).

28. The process of claims 1, 24, or 27, including bonding the interlocked mass of fibers by a thermoplastic resin, starch or a thermosettable resin.

29. A process for rapidly fabricating fiber reinforced thermoset resin articles in which the fiber reinforcement comprises one or more fibers with a melting point or a glass transition temperature above about 130° C., which process comprises the steps of:

(a) providing one or more of such fibers in the form of an interlocked mass in a heated matched metal die mold in an amount such that from about 15 to about 80 weight percent of the fabricated fiber reinforced thermoset resin article is comprised of such fibers;

(b) providing in an accumulator zone a liquid body of a thermosettable organic material having a viscosity determined at 120° C., in the absence of curing agents therefor, of less than about 50 centipoise, and which is curable upon heating to a thermoset resin composition, the viscosity of said liquid body being maintained essentially constant in the accumulator zone by keeping its temperature below that at which curing of said material is substantial;

(c) closing the mold containing the interlocked mass of fibers;

(d) continuously injecting at least a portion of said thermosettable organic material under a substantially constant pressure of from about 10 to about 200 atmospheres from said accumulator zone into the closed mold to thereby fill the cavity in said mold;

(e) curing said thermosettable organic material at such a temperature in said mold that said thermosettable organic material cures within about 3 minutes after being injected into the mold; and then (f) opening said mold and removing the cured thermoset molded article therefrom.

* * * * *

UNITED STATES PATENT AND TRADEMARK OFFICE
CERTIFICATE OF CORRECTION

PATENT NO.   :   4,692,291
DATED        :   September 8, 1987
INVENTOR(S)  :   Richard G. Angell, Jr.

It is certified that error appears in the above-identified patent and that said Letters Patent is hereby corrected as shown below:

Column 7, line 21, "Thou9h" should read --Though--.

Column 7, line 26, "heatin9" should read --heating--.

Column 11, line 55, "#product" should read --product--.

Column 14, line 29, "rationof" should read --ratio of--.

Signed and Sealed this

Fourth Day of October, 1988

*Attest:*

DONALD J. QUIGG

*Attesting Officer*        *Commissioner of Patents and Trademarks*